(12) United States Patent
Shapiro et al.

(10) Patent No.: US 11,327,461 B2
(45) Date of Patent: May 10, 2022

(54) SAFETY ASSURANCES FOR LASER FABRICATION USING TEMPERATURE SENSORS

(71) Applicant: Glowforge Inc., Seattle, WA (US)

(72) Inventors: Daniel Shapiro, Mercer Island, WA (US); Mark Gosselin, Seattle, WA (US); Anthony Wright, Seattle, WA (US); Dean Putney, Seattle, WA (US); Timothy Ellis, Everett, WA (US); Lauren Banka, Seattle, WA (US)

(73) Assignee: Glowforge Inc., Seattle, WA (US)

( * ) Notice: Subject to any disclaimer, the term of this patent is extended or adjusted under 35 U.S.C. 154(b) by 0 days.

(21) Appl. No.: 16/677,241

(22) Filed: Nov. 7, 2019

(65) Prior Publication Data

US 2020/0073362 A1 Mar. 5, 2020

Related U.S. Application Data

(63) Continuation of application No. 15/334,113, filed on Oct. 25, 2016, now Pat. No. 10,509,390, which is a
(Continued)

(51) Int. Cl.
*G05B 19/406* (2006.01)
*B23K 26/03* (2006.01)
(Continued)

(52) U.S. Cl.
CPC .......... *G05B 19/406* (2013.01); *B23K 26/032* (2013.01); *B23K 26/0876* (2013.01);
(Continued)

(58) Field of Classification Search
CPC ........ G05B 19/406; G05B 2219/45041; B23K 37/006; B23K 26/703; B23K 26/38;
(Continued)

(56) References Cited

U.S. PATENT DOCUMENTS 3,721,811 A 3/1973 Taylor et al.
3,967,176 A 6/1976 Wagener et al.
(Continued)

FOREIGN PATENT DOCUMENTS

CN 1364033 A 8/2002
CN 101095033 A 12/2007
(Continued)

OTHER PUBLICATIONS

Dazhong Wu et al. "Cloud Manufacturing: Drivers, Current Status, and Future Trends." vol. 2. Systems; Micro and Nano Technologies Sustainable Manufacturing. Jun. 10, 2013. Retrieved on May 10, 2016. pp. 1-10.
(Continued)

*Primary Examiner* — Ziaul Karim
(74) *Attorney, Agent, or Firm* — Lee Sullivan Shea & Smith LLP

(57) ABSTRACT

Sensor data generated by a sensor of a computer numerically controlled machine can be compared with a forecast. The forecast can include expected sensor data for the sensor, over a course of an execution plan for making a cut with a movable laser cutting head. The sensor data can be generated during execution of the execution plan. During execution of the execution plan, the sensor data can be monitored and a deviation of from the forecast can be detected. It can be determined, based on the detecting, that an anomalous condition of the computer numerically controlled machine has occurred. Based on the determining, an action can be performed.

17 Claims, 11 Drawing Sheets

Related U.S. Application Data continuation of application No. PCT/US2016/017903, filed on Feb. 12, 2016.

(60) Provisional application No. 62/222,757, filed on Sep. 23, 2015, provisional application No. 62/222,758, filed on Sep. 23, 2015, provisional application No. 62/222,756, filed on Sep. 23, 2015, provisional application No. 62/115,562, filed on Feb. 12, 2015, provisional application No. 62/115,571, filed on Feb. 12, 2015.

(51) Int. Cl.
| | |
|---|---|
| *B23K 26/08* | (2014.01) |
| *B23K 37/02* | (2006.01) |
| *B23K 26/38* | (2014.01) |
| *B23K 37/00* | (2006.01) |
| *B23K 37/04* | (2006.01) |
| *B23K 26/70* | (2014.01) |
| *B23K 101/18* | (2006.01) |

(52) U.S. Cl.
CPC ............ *B23K 26/38* (2013.01); *B23K 26/703* (2015.10); *B23K 37/006* (2013.01); *B23K 37/0235* (2013.01); *B23K 37/0408* (2013.01); *B23K 2101/18* (2018.08); *G05B 2219/45041* (2013.01)

(58) Field of Classification Search
CPC .............. B23K 37/0408; B23K 26/032; B23K 37/0235; B23K 26/0876; B23K 2201/18
See application file for complete search history.

(56) References Cited

U.S. PATENT DOCUMENTS

| | | |
|---|---|---|
| 4,055,787 A | 10/1977 | Beadle et al. |
| 4,138,718 A | 2/1979 | Toke et al. |
| 4,383,762 A | 5/1983 | Burkert |
| 4,518,843 A | 5/1985 | Antol et al. |
| 4,589,729 A | 5/1986 | Bridges et al. |
| 4,650,287 A | 3/1987 | Kudo et al. |
| 4,723,219 A | 2/1988 | Beyer et al. |
| 4,863,538 A | 9/1989 | Deckard |
| 4,894,831 A | 1/1990 | Alfrey |
| 4,901,359 A | 2/1990 | Bruder |
| 4,918,611 A | 4/1990 | Shyu et al. |
| 4,998,260 A | 3/1991 | Taniura |
| 5,298,843 A | 3/1994 | Miyajima et al. |
| 5,355,250 A | 10/1994 | Grasso et al. |
| 5,396,279 A | 3/1995 | Vossen |
| 5,475,521 A | 12/1995 | Heidemann |
| 5,585,018 A | 12/1996 | Kanaoka et al. |
| 5,682,319 A | 10/1997 | Boland et al. |
| 5,756,961 A | 5/1998 | Sato et al. |
| 6,031,200 A | 2/2000 | Whitehouse |
| 6,085,122 A | 7/2000 | Manning |
| 6,087,625 A | 7/2000 | Iso |
| 6,284,999 B1 | 9/2001 | Virtanen et al. |
| 6,326,586 B1 | 12/2001 | Heyerick et al. |
| 6,420,674 B1 | 7/2002 | Cole, III et al. |
| 6,420,675 B1 | 7/2002 | Lizotte et al. |
| 6,483,596 B1 | 11/2002 | Philippi et al. |
| 6,498,653 B1 | 12/2002 | Wang |
| 6,528,758 B2 | 3/2003 | Shaffer |
| 6,609,044 B1 | 8/2003 | Basista et al. |
| 6,628,322 B1 | 9/2003 | Cerruti |
| 6,696,667 B1 | 2/2004 | Flanagan |
| 7,456,372 B2 | 11/2008 | Hiramatsu |
| 8,111,904 B2 | 2/2012 | Wallack et al. |
| 8,136,432 B2 | 3/2012 | Travez et al. |
| 8,786,928 B2 | 7/2014 | Dolleris et al. |
| 8,809,780 B2 | 8/2014 | Wollenhaupt et al. |
| 8,921,734 B2 | 12/2014 | Yerazunis et al. |
| 9,020,628 B2 | 4/2015 | Fagan |
| 9,114,478 B2 | 8/2015 | Scott et al. |
| 9,235,205 B2 | 1/2016 | Prestidge et al. |
| 9,469,338 B2 | 10/2016 | Norberg Ohlsson |
| 9,618,926 B1 | 4/2017 | Louette et al. |
| 9,734,419 B1 | 8/2017 | Ye et al. |
| 9,772,067 B2 | 9/2017 | Bunz et al. |
| 9,912,915 B2 | 3/2018 | Sinclair |
| 9,987,798 B2 | 6/2018 | Tyler |
| 10,106,864 B2 | 10/2018 | Zeng et al. |
| 10,234,260 B2 | 3/2019 | Siercks et al. |
| 2001/0012973 A1 | 8/2001 | Wehrli et al. |
| 2002/0129485 A1 | 9/2002 | Mok et al. |
| 2002/0144987 A1 | 10/2002 | Tomlinson et al. |
| 2003/0049373 A1 | 3/2003 | Van De Rijdt et al. |
| 2004/0029493 A1 | 2/2004 | Tricard et al. |
| 2004/0060910 A1 | 4/2004 | Schramm |
| 2004/0207831 A1 | 10/2004 | Aoyama |
| 2004/0223165 A1 | 11/2004 | Kurokawa et al. |
| 2004/0245227 A1 | 12/2004 | Grafton-Reed et al. |
| 2005/0051523 A1 | 3/2005 | Legge et al. |
| 2005/0069682 A1 | 3/2005 | Tseng |
| 2005/0071020 A1* | 3/2005 | Yamazaki .......... G05B 19/4086 700/56 |
| 2005/0115941 A1 | 6/2005 | Sukhman et al. |
| 2005/0142701 A1 | 6/2005 | Yamaguchi et al. |
| 2005/0187651 A1 | 8/2005 | Kimura et al. |
| 2006/0022379 A1 | 2/2006 | Wicker et al. |
| 2006/0043615 A1 | 3/2006 | Zheng et al. |
| 2007/0000889 A1 | 1/2007 | Yamazaki et al. |
| 2007/0032733 A1 | 2/2007 | Burton |
| 2007/0034615 A1 | 2/2007 | Kleine |
| 2007/0181544 A1 | 8/2007 | Sukhman et al. |
| 2008/0058734 A1 | 3/2008 | Hanft et al. |
| 2008/0100829 A1 | 5/2008 | Watson |
| 2008/0101687 A1 | 5/2008 | Goeller |
| 2008/0149604 A1 | 6/2008 | Varriano-Marston et al. |
| 2008/0160254 A1 | 7/2008 | Arnold |
| 2008/0218735 A1 | 9/2008 | Atsumi et al. |
| 2008/0243299 A1 | 10/2008 | Johnson et al. |
| 2008/0249653 A1 | 10/2008 | Ichikawa |
| 2009/0060386 A1 | 3/2009 | Cooper et al. |
| 2009/0120914 A1 | 5/2009 | Lawrence |
| 2009/0250445 A1 | 10/2009 | Yamaguchi et al. |
| 2009/0308851 A1 | 12/2009 | Hamisch et al. |
| 2010/0063603 A1 | 3/2010 | Chandhoke |
| 2010/0081971 A1 | 4/2010 | Allison |
| 2010/0149337 A1 | 6/2010 | Porcino |
| 2010/0193482 A1 | 8/2010 | Ow et al. |
| 2010/0193483 A1 | 8/2010 | Chen et al. |
| 2010/0262590 A1 | 10/2010 | Holt |
| 2010/0274379 A1 | 10/2010 | Hehl |
| 2010/0292947 A1 | 11/2010 | Buk |
| 2010/0301023 A1 | 12/2010 | Unrath et al. |
| 2010/0326962 A1 | 12/2010 | Calla et al. |
| 2011/0005458 A1 | 1/2011 | Cunningham |
| 2011/0080476 A1 | 4/2011 | Dinauer et al. |
| 2011/0108533 A1 | 5/2011 | Boettcher et al. |
| 2011/0127333 A1 | 6/2011 | Veksland et al. |
| 2011/0127697 A1 | 6/2011 | Milne |
| 2011/0135208 A1 | 6/2011 | Atanassov et al. |
| 2011/0193943 A1 | 8/2011 | Campbell |
| 2011/0286007 A1 | 11/2011 | Pangrazio et al. |
| 2011/0316977 A1 | 12/2011 | Pienaar |
| 2012/0026249 A1 | 2/2012 | Kihira et al. |
| 2012/0035745 A1 | 2/2012 | Mori et al. |
| 2012/0109590 A1 | 5/2012 | Trainer et al. |
| 2012/0117787 A1 | 5/2012 | Sun et al. |
| 2012/0120232 A1 | 5/2012 | Nishikawa |
| 2012/0197427 A1 | 8/2012 | Gallucci et al. |
| 2012/0293821 A1 | 11/2012 | Chiba |
| 2013/0158957 A1 | 6/2013 | Lee et al. |
| 2013/0178972 A1 | 7/2013 | Goldsmith et al. |
| 2013/0190898 A1* | 7/2013 | Shilpiekandula ...... G05B 19/19 700/19 |
| 2013/0200053 A1 | 8/2013 | Bordatchev |
| 2013/0211391 A1 | 8/2013 | BenYakar et al. |
| 2013/0304248 A1 | 11/2013 | Lange et al. |

(56) References Cited

U.S. PATENT DOCUMENTS

| | | |
|---|---|---|
| 2014/0005804 A1 | 1/2014 | Brand |
| 2014/0018779 A1 | 1/2014 | Worrell et al. |
| 2014/0032706 A1 | 1/2014 | Kuscher et al. |
| 2014/0039707 A1 | 2/2014 | Curtis et al. |
| 2014/0046131 A1 | 2/2014 | Morita et al. |
| 2014/0071330 A1 | 3/2014 | Zhang et al. |
| 2014/0071486 A1 | 3/2014 | Van Bauwel |
| 2014/0071502 A1 | 3/2014 | Liu |
| 2014/0160273 A1 | 6/2014 | Jedynak et al. |
| 2014/0168293 A1 | 6/2014 | Moreau et al. |
| 2014/0168302 A1 | 6/2014 | Ngo et al. |
| 2014/0268607 A1 | 9/2014 | Wicker et al. |
| 2014/0299586 A1 | 10/2014 | Sawabe et al. |
| 2014/0310122 A1 | 10/2014 | Danielson et al. |
| 2014/0327687 A1 | 11/2014 | Murakami |
| 2014/0330424 A1* | 11/2014 | Garaas ............. G05B 19/40937 700/166 |
| 2014/0368348 A1 | 12/2014 | Lin |
| 2014/0371895 A1 | 12/2014 | Sadusk et al. |
| 2015/0030821 A1 | 1/2015 | Costin, Sr. et al. |
| 2015/0107033 A1 | 4/2015 | Chang et al. |
| 2015/0108095 A1 | 4/2015 | Kruer et al. |
| 2015/0112470 A1 | 4/2015 | Chang et al. |
| 2015/0127137 A1 | 5/2015 | Brandt et al. |
| 2015/0136949 A1 | 5/2015 | De Nooij et al. |
| 2015/0154453 A1 | 6/2015 | Wilf |
| 2015/0158121 A1* | 6/2015 | Di Cairano ........ B23K 26/0869 219/121.78 |
| 2015/0158311 A1 | 6/2015 | Ogasawara et al. |
| 2015/0197064 A1 | 7/2015 | Walker et al. |
| 2015/0212421 A1 | 7/2015 | deVilliers et al. |
| 2015/0228069 A1 | 8/2015 | Fresquet et al. |
| 2015/0245549 A1 | 8/2015 | Kurita et al. |
| 2015/0301327 A1 | 10/2015 | Okugawa et al. |
| 2015/0301444 A1 | 10/2015 | Singh et al. |
| 2015/0355621 A1 | 12/2015 | Ikeda et al. |
| 2015/0360318 A1 | 12/2015 | Aubry |
| 2015/0378348 A1 | 12/2015 | Gupta et al. |
| 2016/0023486 A1 | 1/2016 | Priyadarshi |
| 2016/0059371 A1 | 3/2016 | Chang et al. |
| 2016/0084649 A1 | 3/2016 | Yamazaki et al. |
| 2016/0093540 A1 | 3/2016 | Liu et al. |
| 2016/0147213 A1 | 5/2016 | Murakami |
| 2016/0156771 A1 | 6/2016 | Lee |
| 2016/0193698 A1 | 7/2016 | Hildebrand et al. |
| 2016/0199945 A1 | 7/2016 | McDowell et al. |
| 2016/0210737 A1 | 7/2016 | Straub et al. |
| 2016/0271718 A1 | 9/2016 | Fagan |
| 2016/0303845 A1 | 10/2016 | Arce |
| 2016/0325541 A1 | 11/2016 | Lavrentyev et al. |
| 2016/0349038 A1 | 12/2016 | Ohtsuka et al. |
| 2016/0360409 A1 | 12/2016 | Singh |
| 2016/0367336 A1 | 12/2016 | Lv et al. |
| 2016/0372349 A1 | 12/2016 | Hyakumura |
| 2017/0008127 A1 | 1/2017 | Hyatt et al. |
| 2017/0045877 A1 | 2/2017 | Shapiro et al. |
| 2017/0045879 A1 | 2/2017 | Yang et al. |
| 2017/0051429 A1 | 2/2017 | Sachs et al. |
| 2017/0057008 A1 | 3/2017 | Liu et al. |
| 2017/0123362 A1 | 5/2017 | Masui et al. |
| 2017/0203390 A1 | 7/2017 | Kato |
| 2017/0235293 A1 | 8/2017 | Shapiro et al. |
| 2017/0235294 A1 | 8/2017 | Shapiro et al. |
| 2017/0243374 A1 | 8/2017 | Matsuzawa |
| 2017/0304897 A1 | 10/2017 | Walrand et al. |
| 2017/0341183 A1 | 11/2017 | Buller et al. |
| 2018/0001565 A1 | 1/2018 | Hocker |
| 2018/0113434 A1 | 4/2018 | Shapiro et al. |
| 2019/0014307 A1 | 1/2019 | McNamer et al. |
| 2020/0039002 A1 | 2/2020 | Sercel et al. |
| 2020/0192332 A1 | 6/2020 | Jacobs et al. |
| 2021/0007901 A1 | 1/2021 | Piantoni et al. |

FOREIGN PATENT DOCUMENTS

| | | |
|---|---|---|
| CN | 101283362 A | 10/2008 |
| CN | 201253852 Y | 6/2009 |
| CN | 101559513 A | 10/2009 |
| CN | 101733558 A | 6/2010 |
| CN | 101837517 A | 9/2010 |
| CN | 205958834 U | 2/2017 |
| CN | 105261140 B | 3/2017 |
| CN | 106670656 A | 5/2017 |
| DE | 10 2014 214058 A1 | 1/2016 |
| EP | 0 050 425 A2 | 4/1982 |
| EP | 0954125 A2 | 11/1999 |
| EP | 1309108 A1 | 5/2003 |
| EP | 1 645 925 A1 | 4/2006 |
| EP | 2471625 A2 | 7/2012 |
| EP | 2808123 A1 | 12/2014 |
| FR | 2748562 A1 | 11/1997 |
| JP | H03 254380 A | 11/1991 |
| JP | 04244347 A | 9/1992 |
| JP | H05-205051 A | 8/1993 |
| JP | H06-196557 A | 7/1994 |
| JP | H11123581 A | 5/1999 |
| JP | 2001-330413 A | 11/2001 |
| JP | 2002123306 A | 4/2002 |
| JP | 2006-187782 A | 7/2006 |
| JP | 2006-329751 A | 12/2006 |
| JP | 2008-119718 A | 5/2008 |
| JP | 4311856 B2 | 8/2009 |
| JP | 2018122331 A | 8/2018 |
| WO | WO-94/03302 A1 | 2/1994 |
| WO | WO-96/23240 A1 | 8/1996 |
| WO | WO-01/076250 A1 | 10/2001 |
| WO | WO-2016/131019 A1 | 8/2016 |
| WO | WO-2016/131022 A1 | 8/2016 |

OTHER PUBLICATIONS

Gao, Rong et al. "Human-Machine Collaborative Workshop Digital Manufacturing." ICICTA. 2010 IEEE. May 11, 2010. pp. 445-448.

Examination Report issued in European Patent Application No. 16709185.9, dated Jul. 1, 2020 (Jul. 1, 2020). 5 pages.

First Office Action issued in Chinese Patent Application No. 201680021337.8, dated Apr. 10, 2019. 6 pages. [Chinese language].

First Office Action issued in Chinese Patent Application No. 201680021337.8, dated Apr. 10, 2019. 8 pages. [English language translation].

Inmagine Group. Vectr Free Online Vector Graphics Software. Retrieved Mar. 22, 2021, from https://vectr.com/. 3 pages.

International Search Report and Written Opinion issued in International Application No. PCT/US2016/017900, dated May 27, 2016. 16 pages.

International Search Report and Written Opinion issued in International Application No. PCT/US2016/017901, dated Jun. 3, 2016 (Jun. 3, 2016). 13 pages.

International Search Report and Written Opinion issued in International Application No. PCT/US2016/017903, dated Jun. 1, 2016. 15 pages.

International Search Report and Written Opinion issued in International Application No. PCT/US2016/017904, dated May 23, 2016. (May 23, 2016). 19 pages.

International Search Report and Written Opinion issued in International Application No. PCT/US2017/063187, dated Apr. 3, 2018 (Apr. 3, 2018). 11 pages.

International Search Report and Written Opinion issued in International Application No. PCT/US2017/063188, dated Feb. 16, 2018 (Feb. 16, 2018). 14 pages.

International Search Report and Written Opinion issued in International Application No. PCT/US2017/063189, dated May 2, 2018 (May 2, 2018). 22 pages.

International Search Report and Written Opinion issued in International Application No. PCT/US2017/063190, dated May 3, 2018 (May 3, 2018). 18 pages.

International Search Report and Written Opinion issued in International Application No. PCT/US2017/063191, dated Mar. 21, 2018 (Mar. 21, 2018). 12 pages.

(56) References Cited

OTHER PUBLICATIONS

International Search Report and Written Opinion issued in International Application No. PCT/US2017/063192, dated Apr. 19, 2018 (Apr. 19, 2018). 12 pages.
International Search Report and Written Opinion issued in International Application No. PCT/US2017/063193, dated Feb. 16, 2018 (Feb. 16, 2018). 12 pages.
Second Office Action issued in Chinese Patent Application No. 201680021337.8, dated Nov. 4, 2019. 3 pages. [Chinese language].
Second Office Action issued in Chinese Patent Application No. 201680021337.8, dated Nov. 4, 2019. 4 pages. [English language translation].
Third Office Action issued in Chinese Patent Application No. 201680021337.8, dated Jul. 23, 2020. 11 pages. [Chinese language].
Third Office Action issued in Chinese Patent Application No. 201680021337.8, dated Jul. 23, 2020. 20 pages. [English language translation].
First Office Action issued in Chinese Patent Application No. 201780084613.X, dated Sep. 9, 2021. 11 pages. [Chinese language].
First Office Action issued in Chinese Patent Application No. 201780084613.X, dated Sep. 9, 2021. 21 pages. [English language translation].
Barbosa, W. et al. (Jan. 1, 2012), "Samba Reception Desk: Compromising Aesthetics, Fabrication and Structural Performance in the Design Process,", Digital Aids to Design Creativity, vol. 2, eCAADe 30, pp. 245-254. XP055844557, Retrieved from the Internet:URL:http://papers.cumincad.org/data/works/att/ecaade2012_163.content.pdf [retreived on Sep. 24, 2021].
Extened European Search Report issued in European Patent Application No. 21180624.5, dated Oct. 7, 2021 (Oct. 7, 2021). 13 pages.
Extened European Search Report issued in European Patent Application No. 21182408.1, dated Oct. 8, 2021 (Oct. 8, 2021). 14 pages.
Hartmann, M. et al. (Feb. 27, 2014) "CutCAD User Guide", 71 pages. XP055844537, Retreived from the Internet: URL:https://hci.rwth-aachen.de/index.php?option=com_attatchmetns&task-download&id=2059 [retreived on Sep. 24, 2021].
Hattuniemi, J.M. et al. (2009). "A calibrarion method of triangular sensors for thickness measurement." 2009 IEEE Instrumentation and Measurement Technology Conference, (I2MTC) May 5-7, 2009 Singapore, Singapore, IEEE, Piscataway, NJ, USA, 566-569, XP031492700, ISBN: 978-1-4244-3352-0.
Office Action issued in European Patent Application No. 16709185.9, dated Oct. 27, 2021 (Oct. 27, 2021). 5 pages.
Robertson, D. et al. (Sep. 1991), "CAD and Cognitive Complexity: Beynod the Drafting Board Metaphor," Manufacturing Review, American Society of Mechanical Engineers, New York, US, vol. 4, No. 3, pp. 194-204, XP000233200,ISSN: 0896-1611.
Sass, L. "Synthesis of design, production with integrated digital fabrication", Automation In Construction, Elsevier, Amsterdam, NL, vol. 16, No. 3, Feb. 7, 2007, pp. 298-310, XP005877992,ISSN: 0926-5805, DOI: 10.1016/J.Autcon.2006.06.002.
Sliwinski, P. et al. (2013). "A Simple Model for On-Sensor Phase-Detection Autofocusing Algorithm." Journal of Computer and Communications, vol. 1, No. 6, pp. 11-17, doi: 10.4236/jcc.2013.16003, ISSN: 2327-5219.

\* cited by examiner

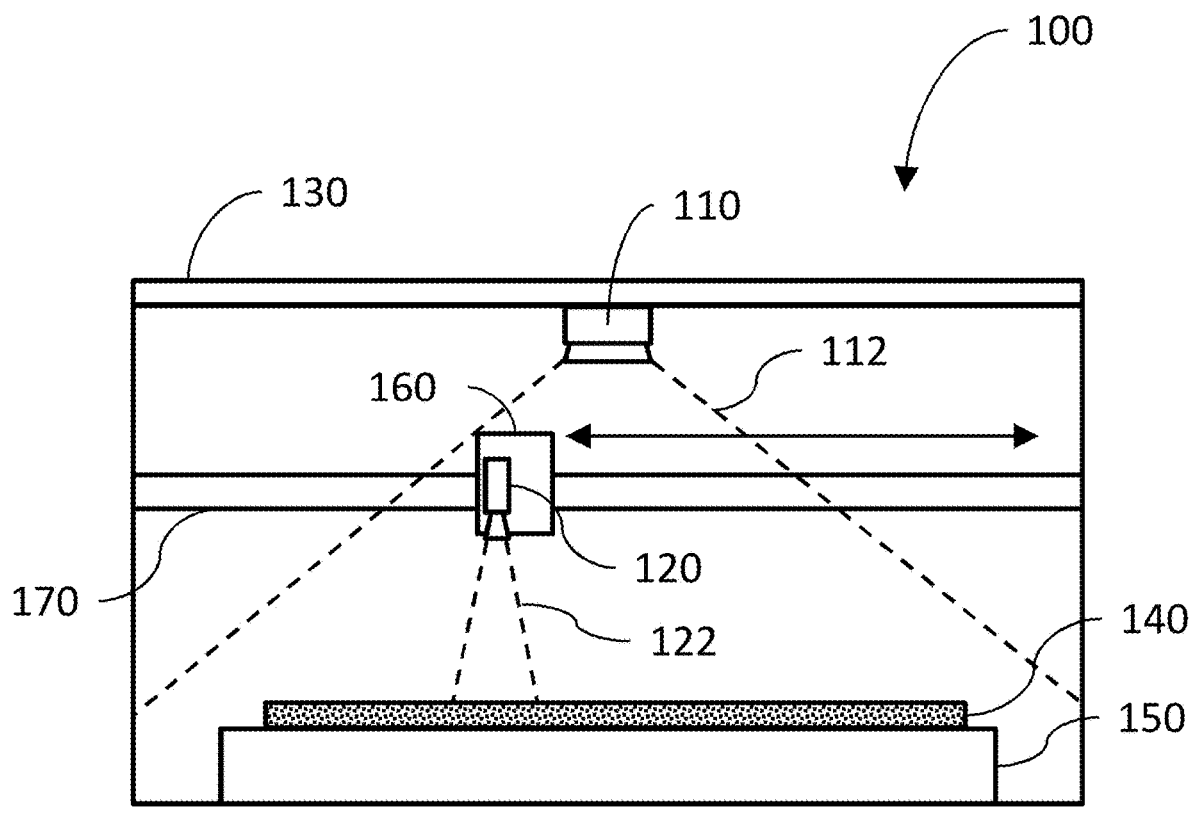
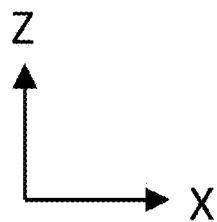
Fig. 1

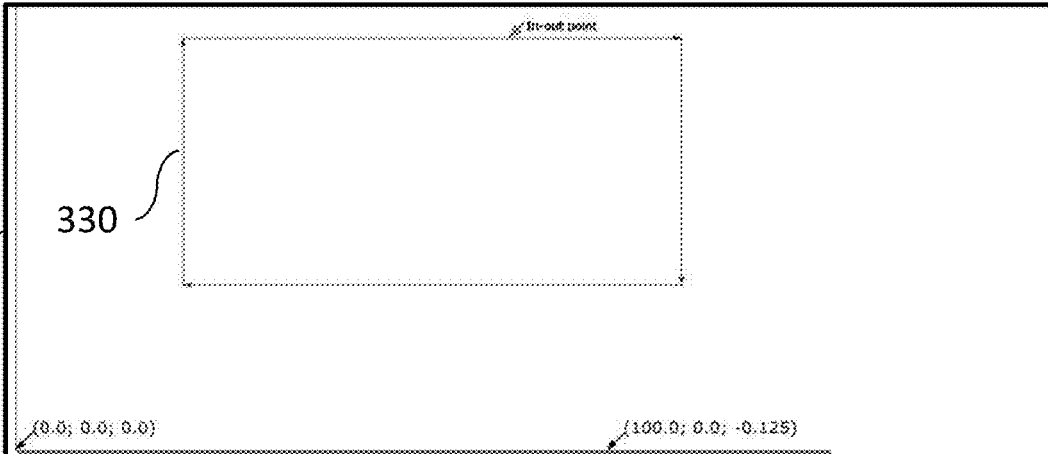

SAFETY ASSURANCES FOR LASER FABRICATION USING TEMPERATURE SENSORS

CROSS-REFERENCE TO RELATED APPLICATIONS

This application is a continuation application of Ser. No. 15/334,113 filed on Oct. 25, 2016, which claims priority under 35 U.S.C. § 119 to International Application No.: PCT/US16/017903 filed Feb. 12, 2016, which claims priority under PCT Article 8 to U.S. Provisional Application 62/222,756 filed on Sep. 23, 2015; U.S. Provisional Application 62/222,757 filed on Sep. 23, 2015; U.S. Provisional Application 62/222,758 filed on Sep. 23, 2015; U.S. Provisional Application 62/115,571 filed on Feb. 12, 2015; and U.S. Provisional Application 62/115,562 filed on Feb. 12, 2015. The entire contents of these applications are incorporated herein by reference in their entirety.

TECHNICAL FIELD

The subject matter described herein relates to manufacturing processes implementing, or aided by, detection of anomalous conditions and the processing of sensor data in a CNC machine.

BACKGROUND

Manufacturing systems, such as "3-D" printers, laser cutters, CNC machines, and the like, can be used to create complicated items where traditional manufacturing techniques like moldings or manual assembly fail. Such automated methods receive instructions that specify the cuts, layers, patterns, etc. before a machine begins construction. The instructions can be in the form of computer files transferred to the memory of a computer controller for the machine and interpreted at run-time to provide a series of steps in the manufacturing process.

SUMMARY

In one aspect, a method is provided comprising one or more operations. In another aspect, a system is provided having one or more components configured to perform one or more operations. The one or more operations can include comparing sensor data generated by a sensor of a computer numerically controlled machine with a forecast. The forecast can be generated based on the execution plan. The forecast can comprise expected sensor data for the sensor over a course of an execution plan. The execution plan can be generated by one or more of a computer numerically controlled machine, a computer in electronic communication with the computer numerically controlled machine, or the like. For example, generating the execution plan can occurs via execution of software by a general purpose computing device in communication with the computer numerically controlled machine over a data connection.

The execution plan can be for making at least one cut with a movable laser cutting head of the computer numerically controlled machine. The sensor data can be generated during execution of the execution plan.

In some variations, the sensor can comprise a motion sensor. The motion sensor can be operatively connected to the movable laser cutting head to measure the motion of the movable laser cutting head.

During the execution of the execution plan the sensor data can be monitored. A deviation from the forecast can be detected based on the monitoring of the sensor data.

A determination can be made that an anomalous condition of the computer numerically controlled machine has occurred. The determination can be based on the detecting of a deviation from the forecast.

An action can be performed in response to determining the occurrence of an anomalous condition of the computer numerically controlled machine. For example, the action can include a corrective action. A corrective action can include changing the motion of the movable laser cutting head.

The execution plan can comprise a motion plan for the laser cutting head. The execution plan can include commands for selectively activating at least one other component of the computer numerically controlled machine.

In some variations, the at least one other component can comprise one or more of a fan, thermal control system, an air filter, a coolant pump, a camera, a lighting device, a laser, or other components.

The data connection between the general purpose computing device and the computer numerically controlled machine can include at least one of the Internet, a wide area network, a wireless network, a wired connection, or the like.

A method as in any preceding claim, wherein the sensor comprises a motion sensor operatively connected to the movable laser cutting head to measure motion of the movable laser cutting head.

A method as in any preceding claim, wherein the action comprises changing the motion of the movable laser cutting head.

A method as in any preceding claim, wherein the execution plan comprises a motion plan for the laser cutting head and commands for selectively activating at least one other component of the computer numerically controlled machine. The at least one other component can include one or more of a fan, thermal control system, an air filter, a coolant pump, a camera, a lighting device, a laser, or the like.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 is an elevational view of a CNC machine with a camera positioned to capture an image of the entire material bed and another camera positioned to capture an image of a portion of the material bed, consistent with some implementations of the current subject matter;

FIG. 3A is a diagram illustrating one example of an SVG source file, consistent with some implementations of the current subject matter;

FIG. 3B is an example of a graphical representation of the cut path in the CNC machine, consistent with some implementations of the current subject matter;

FIG. 3C is a diagram illustrating the machine file corresponding to the cut path and the source file, consistent with some implementations of the current subject matter;

When practical, similar reference numbers denote similar structures, features, or elements.

DETAILED DESCRIPTION

Figure 2:
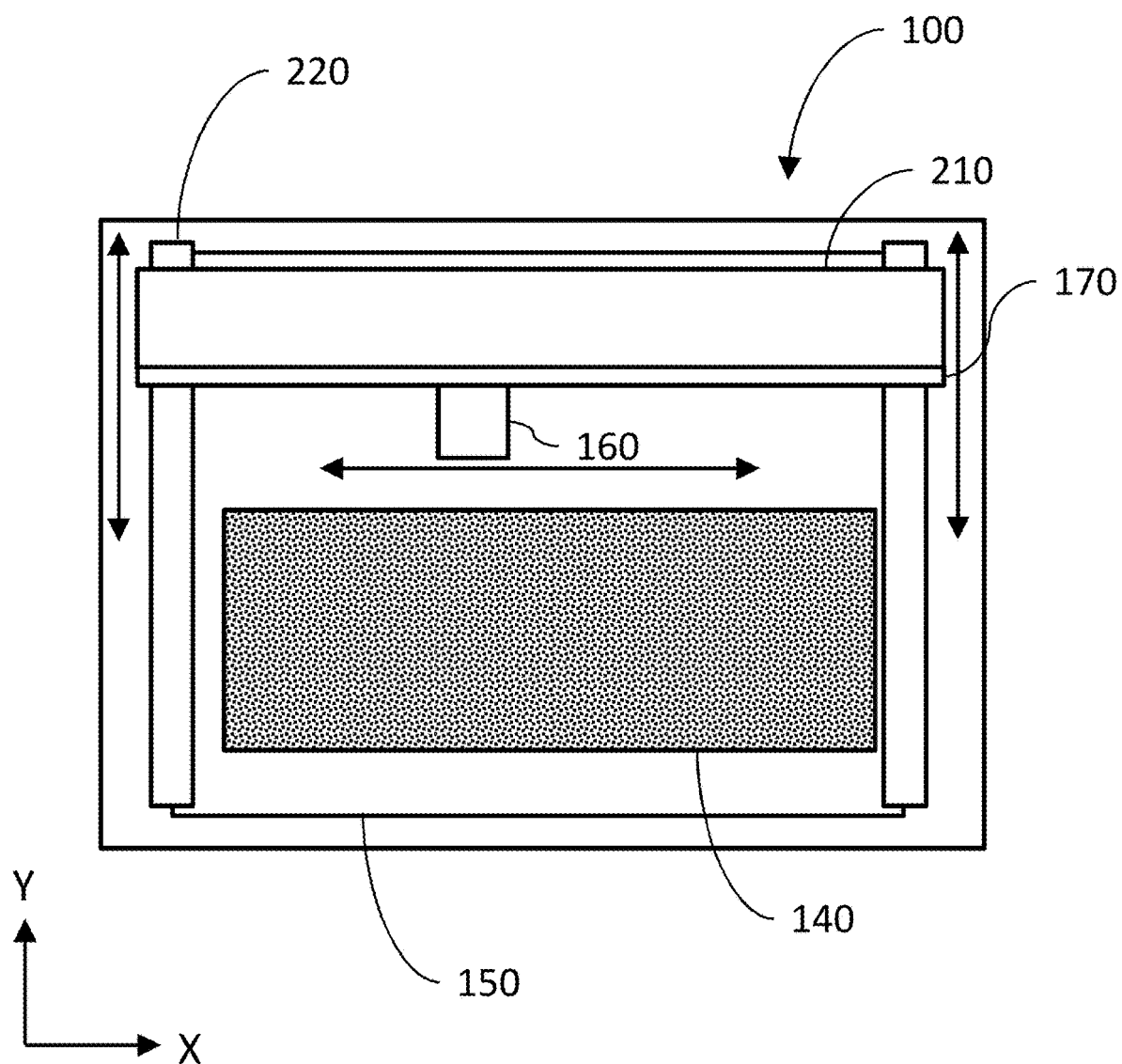
FIG. 2 is a top view of the implementation of the CNC machine shown in FIG. 1.

The details of one or more variations of the subject matter described herein are set forth in the accompanying drawings and the description below. Other features and advantages of the subject matter described herein will be apparent from the description and drawings, and from the claims. While certain features of the currently disclosed subject matter may be described for illustrative purposes in relation to using machine-vision for aiding automated manufacturing processes (e.g. a CNC process), it should be readily understood that such features are not intended to be limiting.

As used herein, the term "cutting" can generally refer to altering the appearance, properties, and/or state of a material. Cutting can include, for example, making a through-cut, engraving, bleaching, curing, burning, etc. Engraving, when specifically referred to herein, indicates a process by which a CNC machine modifies the appearance of the material without fully penetrating it. For example, in the context of a laser cutter, it can mean removing some of the material from the surface, or discoloring the material e.g. through an application of focused electromagnetic radiation delivering electromagnetic energy as described below.

As used herein, the term "laser" includes any electromagnetic radiation or focused or coherent energy source that (in the context of being a cutting tool) uses photons to modify a substrate or cause some change or alteration upon a material impacted by the photons. Lasers (whether cutting tools or diagnostic) can be of any desired wavelength, including for example, microwave, lasers, infrared lasers, visible lasers, UV lasers, X-ray lasers, gamma-ray lasers, or the like.

Also, as used herein, "cameras" includes, for example, visible light cameras, black and white cameras, IR or UV sensitive cameras, individual brightness sensors such as photodiodes, sensitive photon detectors such as a photomultiplier tube or avalanche photodiodes, detectors of infrared radiation far from the visible spectrum such as microwaves, X-rays, or gamma rays, optically filtered detectors, spectrometers, and other detectors that can include sources providing electromagnetic radiation for illumination to assist with acquisition, for example, flashes, UV lighting, etc.

Also, as used herein, reference to "real-time" actions includes some degree of delay or latency, either programmed intentionally into the actions or as a result of the limitations of machine response and/or data transmission. "Real-time" actions, as used herein, are intended to only approximate an instantaneous response, or a response performed as quickly as possible given the limits of the system, and do not imply any specific numeric or functional limitation to response times or the machine actions resulting therefrom.

Also, as used herein, unless otherwise specified, the term "material" is the material that is on the bed of the CNC machine. For example, if the CNC machine is a laser cutter, lathe, or milling machine, the material is what is placed in the CNC machine to be cut, for example, the raw materials, stock, or the like. In another example, if the CNC machine is a 3-D printer, then the material is either the current layer, or previously existent layers or substrate, of an object being crafted by the 3-D printing process. In yet another example, if the CNC machine is a printer, then the material can be the paper onto which the CNC machine deposits ink.

Introduction

A computer numerical controlled (CNC) machine is a machine that is used to add or remove material under the control of a computer. There can be one or more motors or other actuators that move one or more heads that perform the adding or removing of material. For CNC machines that add material, heads can incorporate nozzles that spray or release polymers as in a typical 3D printer. In some implementations, the heads can include an ink source such as a cartridge or pen. In the case of 3-D printing, material can be built up layer by layer until a fully realized 3D object has been created. In some implementations, the CNC machine can scan the surface of a material such as a solid, a liquid, or a powder, with a laser to harden or otherwise change the material properties of said material. New material may be deposited. The process can be repeated to build successive layers. For CNC machines that remove material, the heads can incorporate tools such as blades on a lathe, drag knives, plasma cutters, water jets, bits for a milling machine, a laser for a laser cutter/engraver, etc.

FIG. 1 is an elevational view of a CNC machine 100 with a camera positioned to capture an image of an entire material bed 150 and another camera positioned to capture an image of a portion of the material bed 150, consistent with some implementations of the current subject matter. FIG. 2 is a top view of the implementation of the CNC machine 100 shown in FIG. 1.

The CNC machine 100 shown in FIG. 1 corresponds to one implementation of a laser cutter. While some features are described in the context of a laser cutter, this is by no means intended to be limiting. Many of the features described below can be implemented with other types of CNC machines. The CNC machine 100 can be, for example, a lathe, engraver, 3D-printer, milling machine, drill press, saw, etc.

While laser cutter/engravers share some common features with CNC machines, they have many differences and present particularly challenging design constraints. A laser cutter/engraver is subject to regulatory guidelines that restrict the egress of electromagnetic radiation from the unit when operating, making it challenging for light to enter or escape the unit safely, for example to view or record an image of the contents. The beam of a laser cutter/engraver must be routed from the emitter to the area to be machined, potentially requiring a series of optical elements such as lenses and mirrors. The beam of a laser cutter/engraver is easily misdirected, with a small angular deflection of any component relating to the beam path potentially resulting in the beam escaping the intended path, potentially with undesirable consequences. A laser beam may be capable of causing material destruction if uncontrolled. A laser cutter/engraver may require high voltage and/or radio frequency power supplies to drive the laser itself. Liquid cooling is common in laser cutter/engravers to cool the laser, requiring fluid flow considerations. Airflow is important in laser cutter/engraver designs, as air may become contaminated with byproducts of the laser's interaction with the material such as smoke, which may in turn damage portions of the machine for example fouling optical systems. The air exhausted from the machine may contain undesirable byproducts such as smoke that must be routed or filtered, and the machine may need to be designed to prevent such byproducts from escaping through an unintended opening, for example by sealing components that may be opened. Unlike most machining tools, the kerf—the amount of material removed during the operation—is both small and variable depending on the material being processed, the power of the laser, the speed of the laser, and other factors, making it difficult to predict the final size of the object. Also unlike most machining tools, the output of the laser cutter/engraver is very highly dependent on the speed of operation; a momentary slowing can destroy the workpiece by depositing too much laser energy. In many machining tools, operating parameters such as tool rotational speed and volume of material removed are easy to continuously predict, measure, and calculate, while laser cutter/engravers are more sensitive to material and other conditions. In many machining tools, fluids are used as coolant and lubricant; in laser cutter/engravers, the cutting mechanism does not require physical contact with the material being affected, and air or other gasses may be used to aid the cutting process in a different manner, by facilitating combustion or clearing debris, for example.

The CNC machine 100 can have a housing surrounding an enclosure or interior area defined by the housing. The housing can include walls, a bottom, and one or more openings to allow access to the CNC machine 100, etc. There can be a material bed 150 that can include a top surface on which the material 140 generally rests.

In the implementation of FIG. 1, the CNC machine can also include an openable barrier as part of the housing to allow access between an exterior of the CNC machine and an interior space of the CNC machine. The openable barrier can include, for example, one or more doors, hatches, flaps, and the like that can actuate between an open position and a closed position. The openable barrier can attenuate the transmission of light between the interior space and the exterior when in a closed position. Optionally, the openable barrier can be transparent to one or more wavelengths of light or be comprised of portions of varying light attenuation ability. One type of openable barrier can be a lid 130 that can be opened or closed to put material 140 on the material bed 150 on the bottom of the enclosure. Various example implementations discussed herein include reference to a lid. It will be understood that absent explicit disclaimers of other possible configurations of the operable barrier or some other reason why a lid cannot be interpreted generically to mean any kind of openable barrier, the use of the term lid is not intended to be limiting. One example of an openable barrier can be a front door that is normally vertical when in the closed position and can open horizontally or vertically to allow additional access. There can also be vents, ducts, or other access points to the interior space or to components of the CNC machine 100. These access points can be for access to power, air, water, data, etc. Any of these access points can be monitored by cameras, position sensors, switches, etc. If they are accessed unexpectedly, the CNC machine 100 can execute actions to maintain the safety of the user and the system, for example, a controlled shutdown. In other implementations, the CNC machine 100 can be completely open (i.e. not having a lid 130, or walls). Any of the features described herein can also be present in an open configuration, where applicable.

As described above, the CNC machine 100 can have one or more movable heads that can be operated to alter the material 140. In some implementations, for example the implementation of FIG. 1, the movable head can be the head 160. There may be multiple movable heads, for example two or more mirrors that separately translate or rotate in able to locate a laser beam, or multiple movable heads that operate independently, for example two mill bits in a CNC machine capable of separate operation, or any combination thereof. In the case of a laser-cutter CNC machine, the head 160 can include optical components, mirrors, cameras, and other electronic components used to perform the desired machining operations. Again, as used herein, the head 160 typically is a laser-cutting head, but can be a movable head of any type.

The head 160, in some implementations, can be configured to include a combination of optics, electronics, and mechanical systems that can, in response to commands, cause a laser beam or electromagnetic radiation to be delivered to cut or engrave the material 140. The CNC machine 100 can also execute operation of a motion plan for causing movement of the movable head. As the movable head moves, the movable head can deliver electromagnetic energy to effect a change in the material 140 that is at least partially contained within the interior space. In one implementation, the position and orientation of the optical elements inside the head 160 can be varied to adjust the position, angle, or focal point of a laser beam. For example, mirrors can be shifted or rotated, lenses translated, etc. The head 160 can be mounted on a translation rail 170 that is used to move the head 160 throughout the enclosure. In some implementations the motion of the head can be linear, for example on an X axis, a Y axis, or a Z axis. In other implementations, the head can combine motions along any combination of directions in a rectilinear, cylindrical, or spherical coordinate system.

A working area for the CNC machine 100 can be defined by the limits within which the movable head can cause delivery of a machining action, or delivery of a machining medium, for example electromagnetic energy. The working area can be inside the interior space defined by the housing. It should be understood that the working area can be a generally three-dimensional volume and not a fixed surface. For example, if the range of travel of a vertically oriented laser cutter is a 10"×10" square entirely over the material bed 150, and the laser from the laser beam comes out of the laser cutter at a height of 4" above the material bed of the CNC machine, that 400 in$^2$ volume can be considered to be the working area. Restated, the working area can be defined by the extents of positions in which material 140 can be worked by the CNC machine 100, and not necessarily tied or limited by the travel of any one component. For example, if the head 160 could turn at an angle, then the working area could extend in some direction beyond the travel of the head 160. By this definition, the working area can also include any surface, or portion thereof, of any material 140 placed in the CNC machine 100 that is at least partially within the working area, if that surface can be worked by the CNC machine 100. Similarly, for oversized material, which may extend even outside the CNC machine 100, only part of the material 140 might be in the working area at any one time.

The translation rail 170 can be any sort of translating mechanism that enables movement of the head 160 in the X-Y direction, for example a single rail with a motor that slides the head 160 along the translation rail 170, a combination of two rails that move the head 160, a combination of circular plates and rails, a robotic arm with joints, etc.

Components of the CNC machine 100 can be substantially enclosed in a case or other enclosure. The case can include, for example, windows, apertures, flanges, footings, vents, etc. The case can also contain, for example, a laser, the head 160, optical turning systems, cameras, the material bed 150, etc. To manufacture the case, or any of its constituent parts, an injection-molding process can be performed. The injection-molding process can be performed to create a rigid case in a number of designs. The injection molding process may utilize materials with useful properties, such as strengthening additives that enable the injection molded case to retain its shape when heated, or absorptive or reflective elements, coated on the surface or dispersed throughout the material for example, that dissipate or shield the case from laser energy. As an example, one design for the case can include a horizontal slot in the front of the case and a corresponding horizontal slot in the rear of the case. These slots can allow oversized material to be passed through the CNC machine 100.

Optionally, there can be an interlock system that interfaces with, for example, the openable barrier, the lid 130, door, and the like. Such an interlock is required by many regulatory regimes under many circumstances. The interlock can then detect a state of opening of the openable barrier, for example, whether a lid 130 is open or closed. In some implementations, an interlock can prevent some or all functions of the CNC machine 100 while an openable barrier, for example the lid 130, is in the open state (e.g. not in a closed state). The reverse can be true as well, meaning that some functions of the CNC machine 100 can be prevented while in a closed state. There can also be interlocks in series where, for example, the CNC machine 100 will not operate unless both the lid 130 and the front door are both closed. Furthermore, some components of the CNC machine 100 can be tied to states of other components of the CNC machine, such as not allowing the lid 130 to open while the laser is on, a movable component moving, a motor running, sensors detecting a certain gas, etc. In some implementations, the interlock can prevent emission of electromagnetic energy from the movable head when detecting that the openable barrier is not in the closed position.

Converting Source Files to Motion Plans

A traditional CNC machine accepts a user drawing, acting as a source file that describes the object the user wants to create or the cuts that a user wishes to make. Examples of source files are:

1) .STL files that define a three-dimensional object that can be fabricated with a 3D printer or carved with a milling machine, 2) .SVG files that define a set of vector shapes that can be used to cut or draw on material, 3) .JPG files that define a bitmap that can be engraved on a surface, and 4) CAD files or other drawing files that can be interpreted to describe the object or operations similarly to any of the examples above.

FIG. 3A is a diagram illustrating one example of an SVG source file 310, consistent with some implementations of the current subject matter. FIG. 3B is an example of a graphical representation 320 of the cut path 330 in the CNC machine, consistent with some implementations of the current subject matter. FIG. 3C is a diagram illustrating the machine file 340 that would result in a machine creating the cut path 330, created from the source file 310, consistent with some implementations of the current subject matter. The example source file 310 represents a work surface that is 640×480 units with a 300×150 unit rectangle whose top left corner is located 100 units to the right and 100 units down from the top-left corner of the work surface. A computer program can then convert the source file 310 into a machine file 340 that can be interpreted by the CNC machine 100 to take the actions illustrated in FIG. 3B. The conversion can take place on a local computer where the source files reside on the CNC machine 100, etc.

The machine file 340 describes the idealized motion of the CNC machine 100 to achieve the desired outcome. Take, for example, a 3D printer that deposits a tube-shaped string of plastic material. If the source file specifies a rectangle then the machine file can instruct the CNC machine to move along a snakelike path that forms a filled in rectangle, while extruding plastic. The machine file can omit some information, as well. For example, the height of the rectangle may no longer be directly present in the machine file; the height will be as tall as the plastic tube is high. The machine file can also add some information. For example, the instruction to move the print head from its home position to a corner of the rectangle to begin printing. The instructions can even depart from the directly expressed intent of the user. A common setting in 3D printers, for example, causes solid shapes to be rendered as hollow in the machine file to save on material cost.

As shown by the example of FIGS. 3A-C, the conversion of the source file 310 to the machine file 330 can cause the CNC machine to move the cutting tool from (0,0) (in FIG. 3B) to the point at which cutting is to begin, activate the cutting tool (for example lower a drag knife or energize a laser), trace the rectangle, deactivate the cutting tool, and return to (0,0).

Once the machine file has been created, a motion plan for the CNC machine 100 can be generated. The motion plan contains the data that determines the actions of components of the CNC machine 100 at different points in time. The motion plan can be generated on the CNC machine 100 itself or by another computing system. A motion plan can be a stream of data that describes, for example, electrical pulses that indicate exactly how motors should turn, a voltage that indicates the desired output power of a laser, a pulse train that specifies the rotational speed of a mill bit, etc. Unlike the source files and the machine files such as G-code, motion plans are defined by the presence of a temporal element, either explicit or inferred, indicating the time or time offset at which each action should occur. This allows for one of the key functions of a motion plan, coordinated motion, wherein multiple actuators coordinate to have a single, pre-planned affect.

The motion plan renders the abstract, idealized machine file as a practical series of electrical and mechanical tasks. For example, a machine file might include the instruction to "move one inch to the right at a speed of one inch per second, while maintaining a constant number of revolutions per second of a cutting tool." The motion plan must take into consideration that the motors cannot accelerate instantly, and instead must "spin up" at the start of motion and "spin down" at the end of motion. The motion plan would then specify pulses (e.g. sent to stepper motors or other apparatus for moving the head or other parts of a CNC machine) occurring slowly at first, then faster, then more slowly again near the end of the motion.

The machine file is converted to the motion plan by the motion controller/planner. Physically, the motion controller can be a general or special purpose computing device, such as a high performance microcontroller or single board computer coupled to a Digital Signal Processor (DSP). The job of the motion controller is to take the vector machine code and convert it into electrical signals that will be used to drive the motors on the CNC machine 100, taking in to account the exact state of the CNC machine 100 at that moment (e.g. "since the machine is not yet moving, maximum torque must be applied, and the resulting change in speed will be small") and physical limitations of the machine (e.g. accelerate to such-and-such speed, without generating forces in excess of those allowed by the machine's design). The signals can be step and direction pulses fed to stepper motors or location signals fed to servomotors among other possibilities, which create the motion and actions of the CNC machine 100, including the operation of elements like actuation of the head 160, moderation of heating and cooling, and other operations. In some implementations, a compressed file of electrical signals can be decompressed and then directly output to the motors. These electrical signals can include binary instructions similar to 1's and 0's to indicate the electrical power that is applied to each input of each motor over time to effect the desired motion.

In the most common implementation, the motion plan is the only stage that understands the detailed physics of the CNC machine 100 itself, and translates the idealized machine file into implementable steps. For example, a particular CNC machine 100 might have a heavier head, and require more gradual acceleration. This limitation is modeled in the motion planner and affects the motion plan. Each model of CNC machine can require precise tuning of the motion plan based on its measured attributes (e.g. motor torque) and observed behavior (e.g. belt skips when accelerating too quickly). The CNC machine 100 can also tune the motion plan on a per-machine basis to account for variations from CNC machine to CNC machine.

The motion plan can be generated and fed to the output devices in real-time, or nearly so. The motion plan can also be pre-computed and written to a file instead of streamed to a CNC machine, and then read back from the file and transmitted to the CNC machine 100 at a later time. Transmission of instructions to the CNC machine 100, for example, portions of the machine file or motion plan, can be streamed as a whole or in batches from the computing system storing the motion plan. Batches can be stored and managed separately, allowing pre-computation or additional optimization to be performed on only part of the motion plan. In some implementations, a file of electrical signals, which may be compressed to preserve space and decompressed to facilitate use, can be directly output to the motors. The electrical signals can include binary instructions similar to 1's and 0's to indicate actuation of the motor.

The motion plan can be augmented, either by precomputing in advance or updating in real-time, with the aid of machine vision. Machine vision is a general term that describes the use of sensor data, and not only limited to optical data, in order to provide additional input to machine operation. Other forms of input can include, for example, audio data from an on-board sound sensor such as a microphone, or position/acceleration/vibration data from an on-board sensor such as a gyroscope or accelerometer. Machine vision can be implemented by using cameras to provide images of, for example, the CNC machine 100, the material being operated on by the CNC machine, the environment of the CNC machine 100 (if there is debris accumulating or smoke present), or any combination of these. These cameras can then route their output to a computer for processing. By viewing the CNC machine 100 in operation and analyzing the image data it can, for example, be determined if the CNC machine 100 is working correctly, if the CNC machine 100 is performing optimally, the current status of the CNC machine 100 or subcomponents of the CNC machine 100, etc. Similarly, the material can be imaged and, for example, the operation of the CNC machine 100 can be adjusted according to instructions, users can be notified when the project is complete, or information about the material can be determined from the image data. Error conditions can be identified, such as if a foreign body has been inadvertently left in the CNC machine 100, the material has been inadequately secured, or the material is reacting in an unexpected way during machining.

Camera Systems

Cameras can be mounted inside the CNC machine 100 to acquire image data during operation of the CNC machine 100. Image data refers to all data gathered from a camera or image sensor, including still images, streams of images, video, audio, metadata such as shutter speed and aperture settings, settings or data from or pertaining to a flash or other auxiliary information, graphic overlays of data superimposed upon the image such as GPS coordinates, in any format, including but not limited to raw sensor data such as a .DNG file, processed image data such as a JPG file, and data resulting from the analysis of image data processed on the camera unit such as direction and velocity from an optical mouse sensor. For example, there can be cameras mounted such that they gather image data from (also referred to as 'view' or 'image') an interior portion of the CNC machine 100. The viewing can occur when the lid 130 is in a closed position or in an open position or independently of the position of the lid 130. In one implementation, one or more cameras, for example a camera mounted to the interior surface of the lid 130 or elsewhere within the case or enclosure, can view the interior portion when the lid 130 to the CNC machine 100 is a closed position. In particular, in some preferred embodiments, the cameras can image the material 140 while the CNC machine 100 is closed and, for example, while machining the material 140. In some implementations, cameras can be mounted within the interior space and opposite the working area. In other implementations, there can be a single camera or multiple cameras attached to the lid 130. Cameras can also be capable of motion such as translation to a plurality of positions, rotation, and/or tilting along one or more axes. One or more cameras mounted to a translatable support, such as a gantry 210, which can be any mechanical system that can be commanded to move (movement being understood to include rotation) the camera or a mechanism such as a mirror that can redirect the view of the camera, to different locations and view different regions of the CNC machine. The head 160 is a special case of the translatable support, where the head 160 is limited by the track 220 and the translation rail 170 that constrain its motion.

Lenses can be chosen for wide angle coverage, for extreme depth of field so that both near and far objects may be in focus, or many other considerations. The cameras may be placed to additionally capture the user so as to document the building process, or placed in a location where the user can move the camera, for example on the underside of the lid 130 where opening the CNC machine 100 causes the camera to point at the user. Here, for example, the single camera described above can take an image when the lid is not in the closed position. Such an image can include an object, such as a user, that is outside the CNC machine 100. Cameras can be mounted on movable locations like the head 160 or lid 130 with the intention of using video or multiple still images taken while the camera is moving to assemble a larger image, for example scanning the camera across the material 140 to get an image of the material 140 in its totality so that the analysis of image data may span more than one image.

As shown in FIG. 1, a lid camera 110, or multiple lid cameras, can be mounted to the lid 130. In particular, as shown in FIG. 1, the lid camera 110 can be mounted to the underside of the lid 130. The lid camera 110 can be a camera with a wide field of view 112 that can image a first portion of the material 140. This can include a large fraction of the material 140 and the material bed or even all of the material 140 and material bed 150. The lid camera 110 can also image the position of the head 160, if the head 160 is within the field of view of the lid camera 110. Mounting the lid camera 110 on the underside of the lid 130 allows for the user to be in view when the lid 130 is open. This can, for example, provide images of the user loading or unloading the material 140, or retrieving a finished project. Here, a number of sub-images, possibly acquired at a number of different locations, can be assembled, potentially along with other data like a source file such as an SVG or digitally rendered text, to provide a final image. When the lid 130 is closed, the lid camera 110 rotates down with the lid 130 and brings the material 140 into view.

Also as shown in FIG. 1, a head camera 120 can be mounted to the head 160. The head camera 120 can have a narrower field of view 122 and take higher resolution images of a smaller area, of the material 140 and the material bed, than the lid camera 110. One use of the head camera 120 can be to image the cut made in the material 140. The head camera 120 can identify the location of the material 140 more precisely than possible with the lid camera 110.

Other locations for cameras can include, for example, on an optical system guiding a laser for laser cutting, on the laser itself, inside a housing surrounding the head 160, underneath or inside of the material bed 150, in an air filter or associated ducting, etc. Cameras can also be mounted outside the CNC machine 100 to view users or view external features of the CNC machine 100.

Multiple cameras can also work in concert to provide a view of an object or material 140 from multiple locations, angles, resolutions, etc. For example, the lid camera 110 can identify the approximate location of a feature in the CNC machine 100. The CNC machine 100 can then instruct the head 160 to move to that location so that the head camera 120 can image the feature in more detail.

While the examples herein are primarily drawn to a laser cutter, the use of the cameras for machine vision in this application is not limited to only that specific type of CNC machine 100. For example, if the CNC machine 100 were a lathe, the lid camera 110 can be mounted nearby to view the rotating material 140 and the head 160, and the head camera 120 located near the cutting tool. Similarly, if the CNC machine 100 were a 3D printer, the head camera 120 can be mounted on the head 160 that deposits material 140 for forming the desired piece.

An image recognition program can identify conditions in the interior portion of the CNC machine 100 from the acquired image data. The conditions that can be identified are described at length below, but can include positions and properties of the material 140, the positions of components of the CNC machine 100, errors in operation, etc. Based in part on the acquired image data, instructions for the CNC machine 100 can be created or updated. The instructions can, for example, act to counteract or mitigate an undesirable condition identified from the image data. The instructions can include changing the output of the head 160. For example, for a CNC machine 100 that is a laser cutter, the laser can be instructed to reduce or increase power or turn off. Also, the updated instructions can include different parameters for motion plan calculation, or making changes to an existing motion plan, which could change the motion of the head 160 or the gantry 210. For example, if the image indicates that a recent cut was offset from its desired location by a certain amount, for example due to a part moving out of alignment, the motion plan can be calculated with an equal and opposite offset to counteract the problem, for example for a second subsequent operation or for all future operations. The CNC machine 100 can execute the instructions to create the motion plan or otherwise effect the changes described above. In some implementations, the movable component can be the gantry 210, the head 160, or an identifiable mark on the head 160. The movable component, for example the gantry 210, can have a fixed spatial relationship to the movable head. The image data can update software controlling operation of the CNC machine 100 with a position of the movable head and/or the movable component with their position and/or any higher order derivative thereof.

Because the type of image data required can vary, and/or because of possible limitations as to the field of view of any individual camera, multiple cameras can be placed throughout the CNC machine 100 to provide the needed image data. Camera choice and placement can be optimized for many use cases. Cameras closer to the material 140 can be used for detail at the expense of a wide field of view. Multiple cameras may be placed adjacently so that images produced by the multiple cameras can be analyzed by the computer to achieve higher resolution or wider coverage jointly than was possible for any image individually. The manipulation and improvement of images can include, for example, stitching of images to create a larger image, adding images to increase brightness, differencing images to isolate changes (such as moving objects or changing lighting), multiplying or dividing images, averaging images, rotating images, scaling images, sharpening images, and so on, in any combination. Further, the system may record additional data to assist in the manipulation and improvement of images, such as recordings from ambient light sensors and location of movable components. Specifically, stitching can include taking one or more sub-images from one or more cameras and combining them to form a larger image. Some portions of the images can overlap as a result of the stitching process. Other images may need to be rotated, trimmed, or otherwise manipulated to provide a consistent and seamless larger image as a result of the stitching. Lighting artifacts such as glare, reflection, and the like, can be reduced or eliminated by any of the above methods. Also, the image analysis program can performing edge detection and noise reduction or elimination on the acquired images. Edge detection can include performing contrast comparisons of different parts of the image to detect edges and identify objects or features in the image. Noise reduction can involve averaging or smoothing of one or more images to reduce the contribution of periodic, random, or pseudo-random image noise, for example that due to CNC machine 100 operation such as vibrating fans, motors, etc.

Figure 4A:
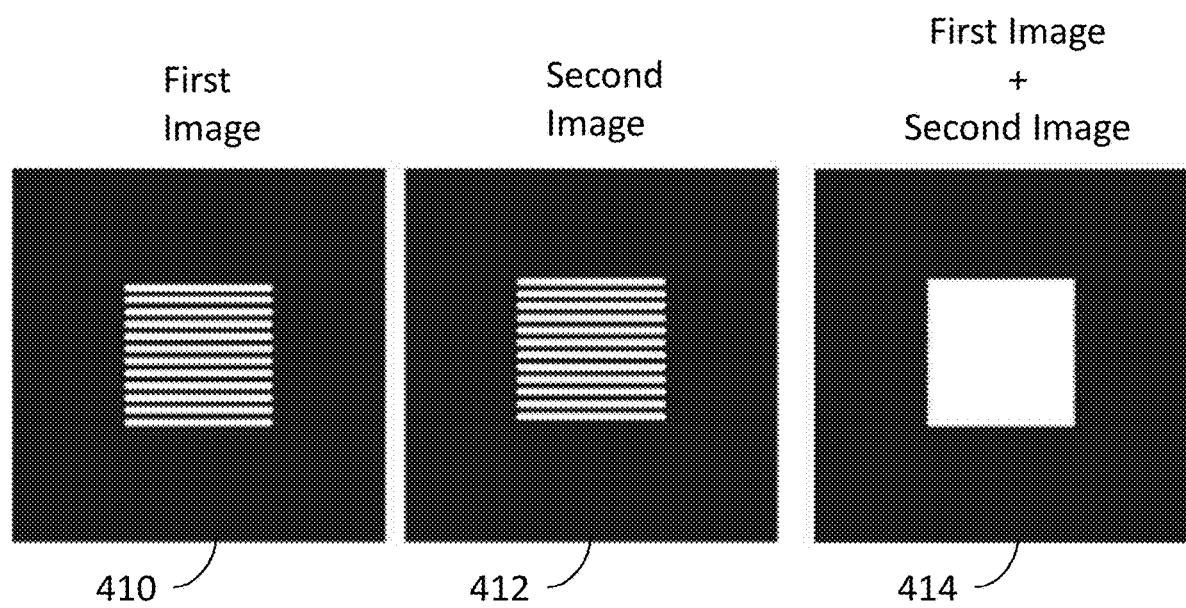
FIG. 4A is a diagram illustrating the addition of images, consistent with some implementations of the current subject matter.

FIG. 4A is a diagram illustrating the addition of images, consistent with some implementations of the current subject matter. Images taken by the cameras can be added, for example, to increase the brightness of an image. In the example of FIG. 4A, there is a first image 410, a second image 412, and a third image 414. First image 410 has horizontal bands (shown in white against a black background in the figure). The horizontal bands can conform to a more brightly lit object, though the main point is that there is a difference between the bands and the background. Second image 412 has similar horizontal bands, but offset in the vertical direction relative to those in the first image 410. When the first image 410 and second image 412 are added, their sum is shown in by the third image 414. Here, the two sets of bands interleave to fill in the bright square as shown. This technique can be applied to, for example, acquiring many image frames from the cameras, possibly in low light conditions, and adding them together to form a brighter image.

Figure 4B:
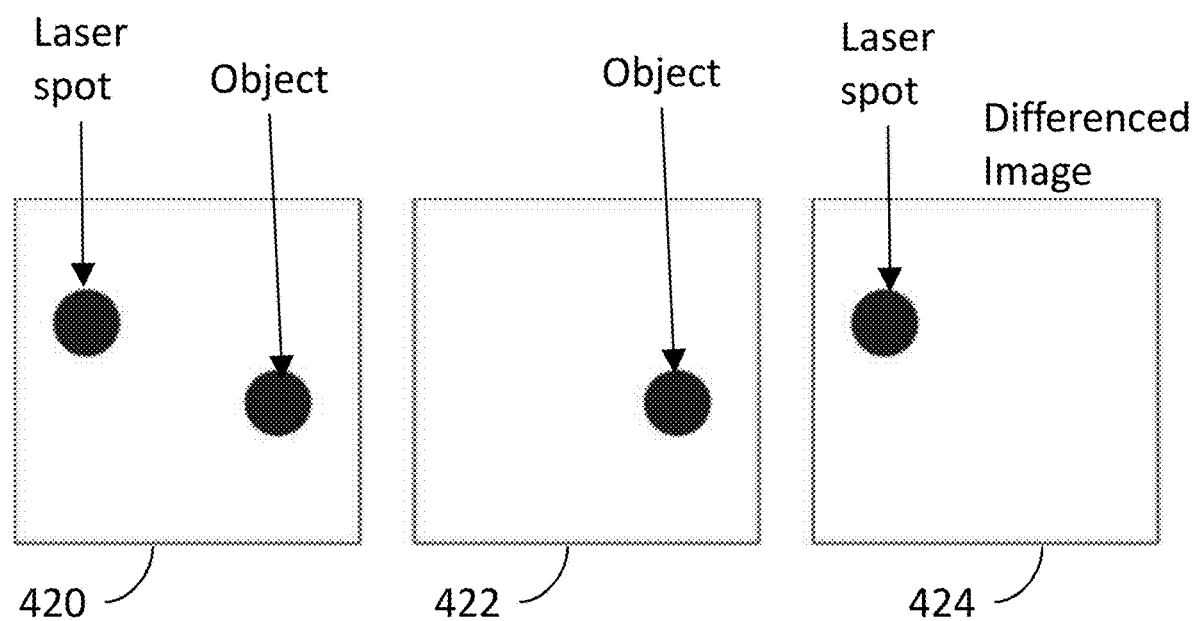
FIG. 4B is a diagram illustrating the subtraction of images, consistent with some implementations of the current subject matter.

FIG. 4B is a diagram illustrating the subtraction of images, consistent with some implementations of the current subject matter. Image subtraction can be useful to, for example, isolate dim laser spot from a comparatively bright image. Here, a first image 420 shows two spots, one representative of a laser spot and the other of an object. To isolate the laser spot, a second image 422 can be taken with the laser off, leaving only the object. Then, the second image 422 can be subtracted from the first image 420 to arrive at the third image 424. The remaining spot in the third image 424 is the laser spot.

Figure 4C:
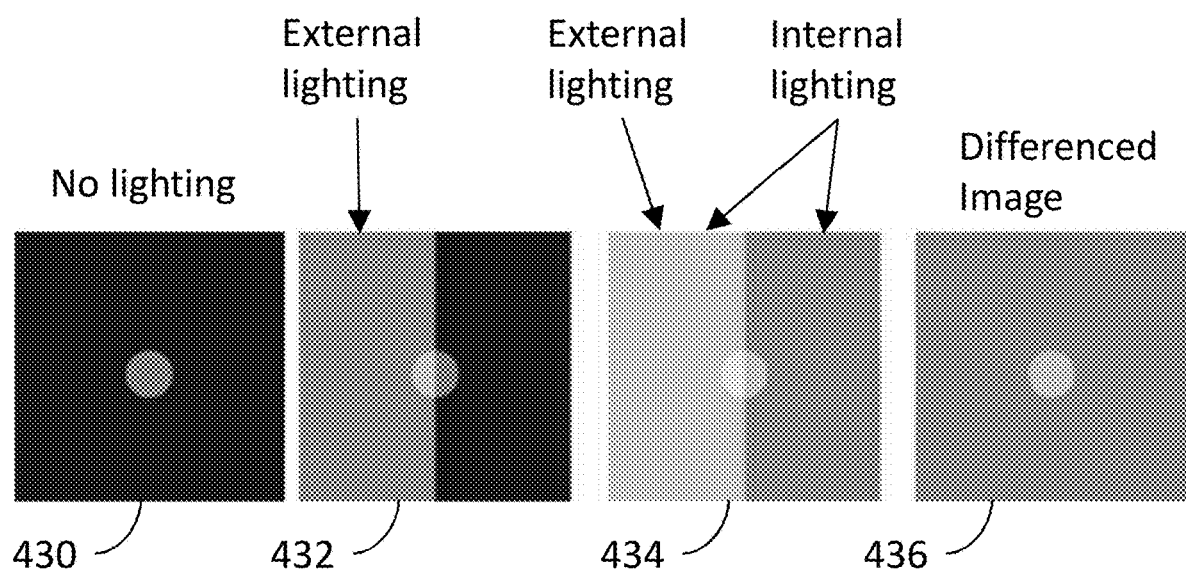
FIG. 4C is a diagram illustrating the differencing of images to isolate a simulated internal lighting effect, consistent with some implementations of the current subject matter.

FIG. 4C is a diagram illustrating the differencing of images to isolate a simulated internal lighting effect, consistent with some implementations of the current subject matter. There can be an object in the CNC machine 100, represented as a circle in first image 430. This could represent, for example an object on the material bed 150 of the CNC machine 100. If, for example, half of the material bed 150 of the CNC machine 100 was illumined by outside lighting, such as a sunbeam, the second image 420 might appear as shown, with the illuminated side brighter than the side without the illumination. It can sometimes be advantageous to use internal lighting during operation, for example to illuminate a watermark, aid in image diagnostics, or simply to better show a user what is happening in the CNC machine. Even if none of these reasons apply, however, internal lighting allows reduction or elimination of the external lighting (in this case the sunbeam) via this method. This internal lighting is represented in the third image 434 by adding a brightness layer to the entire second image 432. To isolate the effect of the internal lighting, the second image 432 can be subtracted from 434 to result in fourth image 436. Here, fourth image 436 shows the area, and the object, as it would appear under only internal lighting. This differencing can allow image analysis to be performed as if only the controlled internal lighting were present, even in the presence of external lighting contaminants.

Machine vision processing of images can occur at, for example, the CNC machine 100, on a locally connected computer, or on a remote server connected via the internet. In some implementations, image processing capability can be performed by the CNC machine 100, but with limited speed. One example of this can be where the onboard processor is slow and can run only simple algorithms in real-time, but which can run more complex analysis given more time. In such a case, the CNC machine 100 could pause for the analysis to be complete, or alternatively, execute the data on a faster connected computing system. A specific example can be where sophisticated recognition is performed remotely, for example, by a server on the internet. In these cases, limited image processing can be done locally, with more detailed image processing and analysis being done remotely. For example, the camera can use a simple algorithm, run on a processor in the CNC machine 100, to determine when the lid 130 is closed. Once the CNC machine 100 detects that the lid 130 is closed, the processor on the CNC machine 100 can send images to a remote server for more detailed processing, for example, to identify the location of the material 140 that was inserted. The system can also devote dedicated resources to analyzing the images locally, pause other actions, or diverting computing resources away from other activities.

In another implementation, the head 160 can be tracked by onboard, real-time analysis. For example, tracking the position of the head 160, a task normally performed by optical encoders or other specialized hardware, can be done with high resolution, low resolution, or a combination of both high and low resolution images taken by the cameras. As high-resolution images are captured, they can be transformed into lower resolution images that are smaller in memory size by resizing or cropping. If the images include video or a sequence of still images, some may be eliminated or cropped. A data processor can analyze the smaller images repeatedly, several times a second for example, to detect any gross misalignment. If a misalignment is detected, the data processor can halt all operation of the CNC machine 100 while more detailed processing more precisely locates exactly the head 160 using higher resolution images. Upon location of the head 160, the head 160 can be adjusted to recover the correction location. Alternatively, images can be uploaded to a server where further processing can be performed. The location can be determined by, for example, looking at the head 160 with the lid camera, by looking at what the head camera 120 is currently imaging, etc. For example, the head 160 could be instructed to move to a registration mark. Then the head camera 120 can then image the registration mark to detect any minute misalignment.

Basic Camera Functionality

The cameras can be, for example, a single wide-angle camera, multiple cameras, a moving camera where the images are digitally combined, etc. The cameras used to image a large region of the interior of the CNC machine 100 can be distinct from other cameras that image a more localized area. The head camera 160 can be one example of a camera that, in some implementations, images a smaller area than the wide-angle cameras.

There are other camera configurations that can be used for different purposes. A camera (or cameras) with broad field of view can cover the whole of the machine interior, or a predefined significant portion thereof. For example, the image data acquired from one or more of the cameras can include most (meaning over 50%) of the working area. In other embodiments, at least 60%, 70%, 80%, 90%, or 100% of the working area can be included in the image data. The above amounts do not take into account obstruction by the material 140 or any other intervening objects. For example, if a camera is capable of viewing 90% of the working area without material 140, and a piece of material 140 is placed in the working area, partially obscuring it, the camera is still considered to be providing image data that includes 90% of the working area. In some implementations, the image data can be acquired when the interlock is not preventing the emission of electromagnetic energy.

In other implementations, a camera mounted outside the machine can see users and/or material 140 entering or exiting the CNC machine 100, record the use of the CNC machine 100 for sharing or analysis, or detect safety problems such as an uncontrolled fire. Other cameras can provide a more precise look with limited field of view. Optical sensors like those used on optical mice can provide very low resolution and few colors, or greyscale, over a very small area with very high pixel density, then quickly process the information to detect material 140 moving relative to the optical sensor. The lower resolution and color depth, plus specialized computing power, allow very quick and precise operation. Conversely, if the head is static and the material is moved, for example if the user bumps it, this approach can see the movement of the material and characterize it very precisely so that additional operations on the material continue where the previous operations left off, for example resuming a cut that was interrupted before the material was moved.

Video cameras can detect changes over time, for example comparing frames to determine the rate at which the camera is moving. Still cameras can be used to capture higher resolution images that can provide greater detail. Yet another type of optical scanning can be to implement a linear optical sensor, such as a flatbed scanner, on an existing rail, like the sliding gantry 210 in a laser system, and then scan it over the material 140, assembling an image as it scans.

To isolate the light from the laser, the laser may be turned off and on again, and the difference between the two measurements indicates the light scattered from the laser while removing the effect of environmental light. The cameras can have fixed or adjustable sensitivity, allowing them to operate in dim or bright conditions. There can be any combination of cameras that are sensitive to different wavelengths. Some cameras, for example, can be sensitive to wavelengths corresponding to a cutting laser, a range-finding laser, a scanning laser, etc. Other cameras can be sensitive to wavelengths that specifically fall outside the wavelength of one or more lasers used in the CNC machine 100. The cameras can be sensitive to visible light only, or can have extended sensitivity into infrared or ultraviolet, for example to view invisible barcodes marked on the surface, discriminate between otherwise identical materials based on IR reflectivity, or view invisible (e.g. infrared) laser beams directly. The cameras can even be a single photodiode that measures e.g. the flash of the laser striking the material 140, or which reacts to light emissions that appear to correlate with an uncontrolled fire. The cameras can be used to image, for example, a beam spot on a mirror, light escaping an intended beam path, etc. The cameras can also detect scattered light, for example if a user is attempting to cut a reflective material. Other types of cameras can be implemented, for example, instead of detecting light of the same wavelength of the laser, instead detecting a secondary effect, such as infrared radiation (with a thermographic camera) or x-rays given off by contact between the laser and another material.

The cameras may be coordinated with lighting sources in the CNC machine 100. The lighting sources can be positioned anywhere in the CNC machine 100, for example, on the interior surface of the lid 130, the walls, the floor, the gantry 210, etc. One example of coordination between the lighting sources and the cameras can be to adjust internal LED illumination while acquiring images of the interior portion with the cameras. For example, if the camera is only capable of capturing images in black and white, the internal LEDs can illuminate sequentially in red, green, and blue, capturing three separate images. The resulting images can then be combined to create a full color RGB image. If external illumination is causing problems with shadows or external lighting effects, the internal lighting can be turned off while a picture is taken, then turned on while a second picture is taken. By subtracting the two on a pixel-by-pixel basis, ambient light can be cancelled out so that it can be determined what the image looks like when illuminated only by internal lights. If lighting is movable, for example on the translation arm of the CNC machine 100, it can be moved around while multiple pictures are taken, then combined, to achieve an image with more even lighting. The brightness of the internal lights can also be varied like the flash in a traditional camera to assist with illumination. The lighting can be moved to a location where it better illuminates an area of interest, for example so it shines straight down a slot formed by a cut, so a camera can see the bottom of the cut. If the internal lighting is interfering, it can be turned off while the camera takes an image. Optionally, the lighting can be turned off for such a brief period that the viewer does not notice (e.g. for less than a second, less than $1/60^{th}$ of a second, or less than $1/120^{th}$ of a second). Conversely, the internal lighting may be momentarily brightened like a camera flash to capture a picture. Specialized lights may be used and/or engaged only when needed; for example, an invisible but UV-fluorescent ink might be present on the material. When scanning for a barcode, UV illumination might be briefly flashed while a picture is captured so that any ink present would be illuminated. The same technique of altering the lighting conditions can be performed by toggling the range-finding and/or cutting lasers as well, to isolate their signature and/or effects when imaging. If the object (or camera) moves between acquisitions, then the images can be cropped, translated, expanded, rotated, and so on, to obtain images that share common features in order to allow subtraction. This differencing technique is preferably done with automatic adjustments in the cameras are overridden or disabled. For example, disabling autofocus, flashes, etc. Features that can ideally be held constant between images can include, for example, aperture, shutter speed, white balance, etc. In this way, the changes in the two images are due only to differences from the lighting and not due to adjustment in the optical system.

Multiple cameras, or a single camera moved to different locations in the CNC machine 100, can provide images from different angles to generate 3D representations of the surface of the material 140 or an object. The 3D representations can be used for generating 3D models, for measuring the depth that an engraving or laser operation produced, or providing feedback to the CNC machine 100 or a user during the manufacturing process. It can also be used for scanning, to build a model of the material 140 for replication.

The camera can be used to record photos and video that the user can use to share their progress. Automatic "making of" sequences can be created that stitch together various still and video images along with additional sound and imagery, for example the digital rendering of the source file or the user's picture from a social network. Knowledge of the motion plan, or even the control of the cameras via the motion plan directly, can enable a variety of optimizations. In one example, given a machine with two cameras, one of which is mounted in the head and one of which is mounted in the lid, the final video can be created with footage from the head camera at any time that the gantry is directed to a location that is known to obscure the lid camera. In another example, the cameras can be instructed to reduce their aperture size, reducing the amount of light let in, when the machine's internal lights are activated. In another example, if the machine is a laser cutter/engraver and activating the laser causes a camera located in the head to become overloaded and useless, footage from that camera may be discarded when it is unavailable. In another example, elements of the motion plan may be coordinated with the camera recording for optimal visual or audio effect, for example fading up the interior lights before the cut or driving the motors in a coordinated fashion to sweep the head camera across the material for a final view of the work result. In another example, sensor data collected by the system might be used to select camera images; for example, a still photo of the user might be captured from a camera mounted in the lid when an accelerometer, gyroscope, or other sensor in the lid detects that the lid has been opened and it has reached the optimal angle. In another example, recording of video might cease if an error condition is detected, such as the lid being opened unexpectedly during a machining operation. The video can be automatically edited using information like the total duration of the cut file to eliminate or speed up monotonous events; for example, if the laser must make 400 holes, then that section of the cut plan could be shown at high speed. Traditionally, these decisions must all be made by reviewing the final footage, with little or no a priori knowledge of what they contain. Pre-selecting the footage (and even coordinating its capture) can allow higher quality video and much less time spent editing it. Video and images from the production process can be automatically stitched together in a variety of fashions, including stop motion with images, interleaving video with stills, and combining video and photography with computer-generated imagery, e.g. a 3D or 2D model of the item being rendered. Video can also be enhanced with media from other sources, such as pictures taken with the user's camera of the final product.

Additional features that can be included individually, or in any combination, are described in the sections below.

Before describing specific methods of detecting anomalies in the CNC machine, several types of sensors that can be placed in or used by the CNC machine, for detecting anomalies, will be described.

Airflow Sensors

CNC machines can incorporate, for example, air exchangers, filtration systems, fans, etc. Airflow sensors can be used to monitor the operation of any air moving components in the CNC machine 100. Airflow sensors can include a combination of propellers, pressure sensors, etc. More indirect types of airflow sensors can be smoke detectors or other gas sensors, particle counters, and cameras that can inspect air particle flow. The airflow sensors can be coupled to the fans, ducts, in the working area of the CNC machine 100 (such as on a wall or the outside of a component), etc. The airflow sensors can monitor, for example, the air velocity at the point of measurement, compute the rate of exchange of the air volume in the CNC machine 100, etc. If the air flow is outside a permissible range based on the type of material being machined, the motion plan, the method of machining, or the like, then the CNC machine 100 can alert a user or alter operation of one or more components to correct the problem.

Connectivity Sensors

Some features of the CNC machine 100 can require connection to the internet or to another computing system. The connection can be wired, for example, a Local-Area-Network (LAN), Ethernet, or fiber optic. The connection can also be wireless, for example, a Wireless Local-Area-Network (WLAN), low-energy wireless, etc. If any required connections are broken or operating at insufficient speeds, the machining process could be slowed, malfunction, or cease altogether. For example, if a CNC machine 100 is receiving instructions from a remote source and the connection becomes slow, the machine could become stuck on a step or between steps, causing damage to the CNC machine 100 or to the material 140 being processed. By monitoring the connectivity sensors, for example by polling connection speed or integrity periodically, anomalies can be avoided. The response of the CNC machine 100 can depend on predetermined instructions depending on the type of problem encountered, and on the desired actions of the CNC machine 100.

In one implementation, the CNC machine 100 can slow or buffer operations in response to detecting a slowdown in a connection.

In another implementation, in response to a connection failure, the CNC machine 100 can execute local instructions causing the CNC machine 100 to enter a safe mode, or execute a controlled shutdown. In response to any detected change in connectivity, the CNC machine 100 can update the motion plan or alert a user. In one example, a rapidly rotating stepper motor can be decelerated at a pace that does not cause it to lose track of its current step, which would occur if the motor were abruptly stopped.

In another implementation, the motion plan can be calculated in portions, which each portion fitting into the memory of the CNC machine 100, with each portion concluding with the machine entering a 'paused' state (head at zero velocity) or a 'safe' state (a machining operation where the material is not being affected, such as a movement from one point to another with the laser disabled, which, if interrupted, can be to reconstructed). If the network connection is interrupted and the next portion of the motion plan is delayed, the current state of the machine is known, the machine can remain in the 'paused' state indefinitely (or safely cease machining operations if in a 'safe' state) while waiting for further portions to arrive. If and when motion is resumed, in response to receiving more portions of the motion plan, there will be minimal or no discontinuity or other error visible in the final operation. By comparison, for other systems lacking this feature, if a cutting operation was interrupted abruptly (e.g. the laser suddenly switched off in the middle of a cut), it could be difficult or impossible to resume the operation in exactly the same manner so as to make the interruption undetectable in the final product.

Coolant Monitors

Some components of a CNC machine 100 can require cooling. For example, a laser cutter can require cooling of the laser, a lathe can require cooling of a drive motor, a 3-D printer can require cooling of extruders, etc. Cooling systems can be fans thermal control systems, fluid-based heat exchangers, a coolant pump, a radiators, etc. Coolant monitors that can be incorporated can include flow meters, temperature monitors, filter diagnostics (to check for a dirty or depleted filter), etc. Data from the coolant monitors can be incorporated into an interlock system or part of a "warm up" phase for the CNC machine 100. For example, in one implementation, the CNC machine 100 will not perform actual machining unless the cooling system has run for a specified length of time or the cooling medium is a certain temperature. Coolant temperature can also indicate problems in, for example, the laser tube, the power supply, a fire in the unit, ambient temperatures above the operating envelope, etc.

An air filter can be incorporated into the CNC machine to filter air used for cooling the CNC machine.

Current Sensors

Electrical current through one or more current-carrying paths, such as wires, bus bars, switches, or the like, can be monitored to confirm that they are operating normally. Current sensors can include shunt resistors, induction coils, Hall probes, Rogowski coils, fiber-optic current sensors, etc. If the measured current is outside of permissible bounds, an alert can be provided. In one implementation, current sensors can be connected to motors or other drive components. If an overcurrent condition is detected, defined as current in excess of the motor's maximum rating, the motor or component can be, for example, shut down, slowed down, or an alert to a user can be sent. In another implementation, the forecasted current draw may be calculated, and variations from that amount are considered an anomaly; even if the current draw is within the motor's maximum rating. For example, if the motor current is higher than forecasted, the motor may be damaged, blocked, or in need of lubrication. In another example, if the motor current is lower than forecasted, the motor may have a broken belt or gear so that no load is present. Also, the location of the current sensor can be combined with other sensor data to further isolate the problem. For example, if a the current sensor in a fan detects an abnormally high current, but an airflow sensor is reporting normal operation, then the system can report that the fan is drawing more current to compensate for an increased friction in the fan. Similarly, a current spike in a given electrical component can indicate the presence of a short. Current waveforms can also be analyzed to determine the presence of stray capacitance, resistive heating of components, etc.

To identify the component responsible for the current anomaly, some components can be turned off in a predefined sequence to isolate the problem. For example, the last component turned off before the current sensor readings returned to normal can be inferred to be the source of the anomaly. This determination can then be communicated to a user, for example by a computer interface.

Microphones

CNC machines often make characteristic sounds depending on their mode of operation, the material being machined, etc. Microphones positioned either on the inside or outside of the CNC machine 100, or specifically directed at a particular component or location, can be used to monitor sounds. In some implementations, the microphones can monitor for regular sounds, such as a motor running, a fan turning, etc. If the sound is not heard, this can indicate a possible component failure. In other implementations, if a sound is detected, but does not agree with an expected audio waveform, this can also indicate a possible component failure or anomalous condition. In one implementation, there can be a microphone proximate to a stepper motor that can listen for skips in the stepper motor. Such a skip can be determined by comparing the observed audio waveform with a waveform captured during normal operation, by comparing the waveform with a waveform captured during a skip, or by comparing the waveform with a forecasted waveform created by a computer based on the expected behavior of the motor. In another implementation, the microphones can listen for a turning of a drill bit. If the drill bit gets stuck, then there can be no sound coming from the drilling area, but there may be unusual sounds coming from the drive motor.

Software or hardware based signal augmenters such as high and low pass filters may be used to isolate stimuli of interest and nullify the effects of the ambient noise generated by the CNC machine operation or that of the environment the CNC machine 100 is placed within. In this case, the microphone can record during an instance of no operation prior to recording during an active cut. Then, when a cut is actually in progress, data collected from the microphone can have frequencies derived from the ambient recording filtered out in order to provide a more useful and accurate source of information.

To distinguish between sounds coming from outside the CNC machine 100 and sounds from inside the CNC machine 100, there can be microphones placed internally and externally to allow differencing of the recorded sounds. If the sound on an interior microphone is louder than the sound on an exterior microphone, it can be inferred that the sound originated inside the CNC machine 100, and vice versa. However, the audio analysis program making this determination can also take into account, for example, known or expected distortion of sounds through one or more intervening barriers or objects, the type of sound (such as identifying a known drilling or cutting sound), etc.

Photodiodes

Some conditions present in the CNC machine 100 can be well-suited to a more limited or dedicated type of optical analysis than that provided by the camera systems. Photodiodes can provide an inexpensive way of detecting a light signature that can be representative of a condition or anomaly in the CNC machine 100. Photodiodes also tend to be physically small in size, and can therefore be easier to locate inside compact components. Photodiodes can be combined with optical filters to detect a narrower wavelength of light. For example, if UV light is used in the CNC machine 100 for curing UV-sensitive resins or illumination of watermarks printed in UV-sensitive ink on the material, a filter can be placed on the photodiode to avoid saturation by the UV light source or to selectively filter for the UV light, depending on the use of the photodiode. Similarly, a photodiode can be selected or filtered to detect a wavelength of light that is associated with an anomalous condition, such as a fire, sparks, etc. The photodiodes can be directed at the interior of the CNC machine 100 as a whole, or at a specific location, such as an optical component like a lens, a mirror, the surface of a material where it is being cut by a laser, etc.

Infrared thermometers, passive infrared sensors, pyrometers, or other thermally-sensitive sensors can be used to detect the presence of fire or unusual amounts of heat from, for example, a cut location on the material, a cutting tool, a component that may overheat, etc., without the need for direct contact with a heated area as required by a temperature sensor like a thermistor. In other implementations, a fraction of a laser beam in a CNC machine 100 can be directed to a photodiode, infrared thermometer, beam dump, etc. Here, a beam dump can be any kind of heat, light, or particle absorbing medium that is placed in the CNC machine to absorb or attenuate the laser beam. By measuring the output of the photodiode, a current or temperature of a beam dump, reading from the infrared thermometer, or the like, the power of the laser beam can be monitored. In some implementations, photodiodes or other optical sensors can be adjusted to point to a particular location in the CNC machine 100 for specific analysis of that location.

In one implementation of a CNC machine 100 in which a lid camera 110 is positioned to take images of the full material bed 150, a photodiode can monitor the ambient light within the machine in order to account for external factors that may otherwise limit its utility. Detection of light entering the device, for instance, can be used to adjust the brightness and white balance of the images taken or the brightness of LEDs that shine into the material bed in order to ensure consistency of data collected in the face of varied external stimuli.

In a similar implementation of a CNC machine 100 with closed walls and a single point of insertion of new materials by a user, photodiodes can be used in order to detect certain binary inputs and halt device operation if necessary. A sudden change in light entering the device unanticipated by an active motion plan, for instance, may be indicative of the lid of the device being opened and thus be cause for halting an activity or triggering a controlled shutdown.

Infrared Sensors

In some implementations of the CNC machine 100, for example where the CNC machine 100 is a laser cutter, the alignment and/or presence of the laser can be determined by monitoring the beam. This is particularly challenging for CO2 lasers, which emit light in the far infrared, where it is not visible with most commonly available cameras or photodiodes. Infrared (IR) thermometers and similar solid-state infrared detecting sensors can be used to monitor laser beams with primary wavelengths in the wavelength range of the IR sensor. For low power beams, the IR sensor (hereafter referring to any sensor sensitive to the laser wavelength or secondary effects) can detect the beam directly. For higher power beams, a fraction of the beam's power may be split off and redirected at the IR sensor. Alternately, light scattered from the beam colliding with other elements such as mirrors or lenses, or stray, lower-power light around the perimeter of the main beam, may be detected. When the laser is on, the IR sensor can detect incoming photons from the laser, or heat emitted from objects struck by the laser beam. Alternately, heat emitted from objects struck by the laser beam may be measured by more conventional temperature sensors, such as thermistors. The IR sensor therefore can function as a way to verify the beam's state, or the power of the laser. If the power is too low or too high, then the power to the laser can, for example, be adjusted to compensate or a user can be alerted.

In one implementation, there can be a single IR sensor located proximate to the beam. In another implementation, the single IR sensor is located away from the beam, where laser emissions may be directed towards it. In another implementation, there can be multiple IR sensors, for example, three arranged symmetrically around the laser beam, which can verify laser alignment. If the IR sensor readings are identical, the light received by the IR sensors should be equivalent, and the beam can be considered to be in the correct location. Optionally, a calibration factor can be applied to each IR sensor to account for the response of the individual IR sensors or variation in beam intensity across its cross-section, etc. The IR sensors can be located at any point along the beam path. In one implementation, the IR sensors can be located in the head to confirm that the laser beam is entering the head at the proper location.

The output of the IR sensor can be compared with other IR sensors to determine a number of anomalous conditions. First, the laser power, assuming a short beam path with little divergence, should be nearly constant. By measuring the beam power at different locations, for example, at the source, inside a turning system, at the head, or the like, localized anomalies can be detected. For example, it can be detected if the beam becomes mis-aligned, attenuated, blocked, etc., and the location of the anomaly may be deduced by determining which sensor detected the reading. Also, the output of the IR sensor can be compared with the execution plan, the motion plan, and/or other sensors monitoring the CNC machine 100 output. For example, if the IR sensor was detecting that the laser was on, but no beam was emerging from the head 160, then it can be determined that a misalignment or obstruction was present.

In one example, an IR sensor can be located within the head, and its output signal can be used to measure the amount of laser power being delivered to the head. As a precaution to ensure that the laser is operating correctly, the laser can be turned on (and optionally turned off again immediately) while the power at the head is measured. If the IR sensor registers that the intended beam power is delivered to the head, then the laser can be operated normally and safely. If the IR sensor registers that the laser power is lower than expected, or no laser power is detected, the laser is disabled immediately. The anomaly could result from, for example, a mis-aligned mirror, a block in the beam path, a critical component removed from the system, or a laser tube failure. This is a particularly important failure mode to detect because if the beam is reflected so that it does not enter the head as designed, it could be hazardous. In another example, and IR sensor may detect a derivative of the laser power being delivered to the head, the heat generated by laser power delivered to the head, or some other measurement indicative of the power and location of the beam.

Position Sensors

Position or motion sensors, such as accelerometers, gyroscopes, linear encoder, shaft encoder, or any other sensor that measures the zeroth, first, second, or higher order derivative of position or angle) can monitor the position, motion and/or behavior of components of the CNC machine 100. Position and/or motion sensors can be located on, for example, the head 160, lid 130, gantry 210, the outer housing, control boards, etc. The motion sensors, such as accelerometers, can measure the motion of the component to which they are attached. Position sensor readings can be used singly or combined to detect anomalies. Location or rotation sensors, such as rotary or linear encoders that report a motor's position, may be used for the same purpose by taking the derivative of their location over time.

Position and/or motion sensors can be used to detect circumstances that are outside of normal or allowable operating parameters, for example an acceleration that would bend the frame of the machine. The measured sensor data can also be compared with a library of known-problematic sensor readings to detect anomalies; or may be compared with a forecast to detect deviations from the expected behavior. Deviations from the motion plan can indicate misalignment of the component. As one example, if the head 160 is ordered to move along the X dimension and some acceleration is detected along the Y dimension, it can be concluded that the gantry 210 is not parallel to the X axis. If a discrepancy is detected, the operations can be halted and an alert sent to the user to verify the position of the head 160. Alternatively, there can be an automatic recalibration in response to a detected discrepancy, for example using the motors that drive the gantry to straighten it. In other implementations, the motion plan can be calculated or recalculated to take this deviation into account, adding a small amount of Y-axis movement to offset the Y-axis drift that was observed. The data from any of the position sensors can be compared to a position sensor located elsewhere on the CNC machine 100 to provide a relative change in position. This can provide additional information to isolate which parts of the machine experienced the anomaly.

In one implementation, the acceleration of a moving portion of the machine 100 such as the head 160 and the acceleration of the housing can be analyzed to determine if the head 160 has become mis-aligned. An analysis program can use the position sensor data to determine if the distance and/or relative position of the position sensors is consistent with the motion plan or other desired configuration.

Multiple position and/or motion sensors used in tandem can be used to track the overall displacement of the CNC machine 100 itself. For example, if two sensors on opposing sides of the device both register similar changes in position over a short period of time, it is likely that the device itself is actively moving. This can be the result of rapid movements of mechanized interior components of some mass (for instance the head 160 or gantry 210) or an unexpected change in exterior support (such as the moving of some piece of furniture upon which the machine is placed). In these situations, feedback may be provided to the user in order to determine an appropriate corrective course of action.

In another implementation, an unexpected acceleration detected on the head 160 can be compared with the accelerations measured on the outer housing to see if the acceleration was local to the head 160, for example a collision with a tool left on the machine bed, or was external and felt by both sensors, for example a person bumping the CNC machine 100. One particularly useful function of the position sensors can be to replace limit switches which are typically used to alert the machine when the head 160 is attempting to move outside its design parameters. This can be both an alert, to trigger an error state, or a calibration technique, where the CNC machine 100 moves the head 160 until it reaches its outer limit, indicating that it is at a known location. This can be replaced by position sensors by simply running the head 160 until it contacts its limits of travel, which are detected via acceleration measured via the position sensors instead of physical switches.

In one implementation, a motion plan can be generated that deliberately instructs the head 160 to move indefinitely in a direction. The motion of the head 160 is reduced or stopped as it reaches the end of its travel, for example by colliding with a bumper or with the wall of the machine. A position sensor such as an accelerometer is used to detect when this occurs, and the calibration routine notes that, at this location, the head is at its far limit of travel. This is normally accomplished with a switch (a 'limit switch') that must be actuated by physical contact; a common cause of damage to CNC machines is switch failure, causing motors to turn indefinitely, damaging the system.

In another implementation, the acceleration of the head is continuously monitored, and if the accelerometers produce a signal that matches the signature of a collision, actions are taken to respond to the anomaly (for example removing power from the motors).

Position sensors in lid 130, door, access hatch, flap, or other moving component that allows access to a portion of the laser can detect the lid 130 opening or closing, the position of the lid 130, whether the lid is open or closed based on the position or angle of the lid 130, the rate at which the lid 130 is being opened or closed, etc. Position sensor data can be integrated with normal use, for example to act as a safety precaution to prevent operation when the lid 130 is open. Position sensors can also determine whether a lid is sufficiently stationary for of recording of images by the lid camera 110, or whether the lid 130 is sufficiently opened for a clear picture to be taken of the user. The detection of the lid 130 being open can also initiate a controlled shutdown as described below. Lid actuation can be detected by a position sensor not positioned on the lid, for example by detecting vibrations or motion characteristic of the lid 130 closing.

Position sensors can be mechanically connected to, for example, a control board, a printed-circuit board, a motherboard, an individual processor or computer chip, cabling, etc. The position sensors can detect conditions such a shaking, jolts, or other impacts, that can be either abnormal for expected machine operation, or exceed tolerances of the connected components. In some implementations, the CNC machine 100 can slow or alter execution of the motion plan until the measured accelerations are within tolerance. While excessive acceleration may not cause an obvious failure, accelerometer data acquired in this way can be used to provide an alert to a user that the component could possibly have sustained damage. The position sensors can run during, for example, execution of the motion plan, whenever the CNC machine 100 is powered, or continuously in a low-power mode to log acceleration data even when the CNC machine 100 is otherwise not operating. The low-power mode can be used to identify motion patterns that can indicate that the CNC machine 100 may have sustained damage during transport.

Position sensors can be used to track the overall displacement of a component by measuring a number of small deviations over a period of time and combining them. For example, by integrating the measured acceleration of a component over time, a position and velocity profile can be determined. The measured profiles can be compared to allowed profiles, and when a difference between the two exceeds a certain value, a correction to the motion of the component can be made or a user can be alerted. In some implementations, this integrated measurement with the position sensors can replace or augment an encoder used with a motor, for example, a motor used with the head 160 or the gantry 210.

Pressure Sensors

Pressure sensors can be used to determine the air pressure in the CNC machine 100. Examples of pressure sensors can include capacitive pressure sensing, or if the CNC machine 100 is under vacuum, ion gauges, etc. In some implementations, measurements of the pressure inside the CNC machine 100 can be used to confirm the presence of a positive pressure region. For example, a positive pressure region, relative to the outside environment, can be maintained to reduce contaminants entering the CNC machine 100. Conversely, a negative pressure can be maintained in the CNC machine 100 to reduce smoke or other harmful gasses from escaping. This can be used on concert with an air filter or exhaust system to safely remove any smoke or hazardous fumes. A combination of pressure regions can be established and monitored during operation of the CNC machine 100. For example, the pressure in the head can be maintained, with an air line, fan, or the like, to maintain a positive pressure so debris or smoke does not coat or cloud any exposed optics. However, the overall pressure of the CNC machine 100 can be negative relative to the outside, for the reasons discussed above. Changes in pressure can be used to detect anomalies, such as a breach of the walls of the case, for example someone opening an access panel. Changes in pressure can also be used to detect intended behaviors, for example in the case of a CNC machine with an opening through which materials may be inserted, a change in pressure may indicate that a piece of material has been inserted into the opening, restricting the airflow.

Smoke Sensors

Smoke including combustion products and airborne particulates are a natural consequence of many machining operations. Material, when cut, engraved, turned, or the like, gets hot and there can be burning or scoring around the area worked. By detecting the amount, composition, or the like, of the smoke, some anomalous events can be determined. For example, in one implementation, a smoke detector can determine that there is too much smoke, suggesting the presence of an uncontrolled fire. In another example, the machine can determine that the fans need more power to offset a smoke-producing operation, or can be run more quietly because no smoke is being produced. Similarly, detecting an amount or type of smoke that is not necessarily due to a hazardous condition, but still not in agreement with that expected by the motion plan, can indicate, for example, that an incorrect material is present, contaminants are present on the material such as oil or paint, or that there is a malfunction in the CNC machine 100, such as too much laser power. If the smoke detector is capable of measuring the particulate size and/or composition, then the type of material producing the smoke can be determined. Smoke levels can be conveyed to the user, for example notifying the user that the air has cleared and the machine can be opened, or that an air filter has failed.

Thermal Sensors

Thermal sensors (thermometers) can be incorporated throughout the CNC machine 100 to measure the temperature of components in contact with the active sensing area of the thermometer. The measured temperature can indicate anomalous conditions such as incorrect set points, overheating, fire, etc. Thermometers can be connected to optical components such as mirrors or lenses. They can also be connected to electrical components such as control boards, the laser, motors, cooling systems, ventilation systems, heaters, etc. Because some CPU's will fail above a certain temperature, the temperature of the CPU's can be closely monitored. Temperature readouts can be incorporated by the CNC machine 100 to alter operation in response to a temperature outside of a permissible operating range. As one example, if a motion plan is making some components of the CNC machine 100 run hot, then the execution of the motion plan can be slowed to allow the components to operate a lower temperature. In another example, if a CPU is reading a temperature higher than forecast, it may be a sign of a different anomaly, for example a bug that is causing additional unwanted program operations, causing the chip to heat more than expected.

A thermometer can monitor the ambient temperature within the machine in order to account for external factors that may otherwise limit its utility. In a similar implementation of a CNC machine 100 with closed walls and a single point of insertion of new materials by a user, thermometers can be used in order to detect certain binary inputs and halt device operation if necessary. A sudden change in temperature in the device unanticipated by an active motion plan, for instance, may be indicative of a fan stopping and thus be cause for halting an activity or triggering a controlled shutdown.

Anomaly Detection—General

Anomaly detection, as used herein, can refer to any kind of unexpected or impermissible condition or operation in the CNC machine 100. Examples of anomalies can include fire, smoke, a laser mis-firing or failing to fire, unusual noises, a motor failing to move, a component failing or overheating, etc. Sensors can be used to detect anomalies, and in so doing may in some cases anticipate further anomalies. For example, a microphone detecting an unexpected sound from a fan can anticipate or prevent another anomalous event, such as the fan failing. Based on the received sensor data, the CNC machine 100 can change operation according to predetermined instruction or alert a user.

Permissible ranges for sensor data to indicate the presence of an anomaly can be adjusted based on the motion plan, the type of CNC machine 100, the material, etc. For example, it can be normal for some types of materials to produce more smoke when they are cut as compared to others. By adjusting the permissible ranges, the conditions for responding to an anomaly can more accurately correspond to the occurrence (or not) of an actual anomaly.

As used herein, "detection" or "monitoring" of conditions by a particular type of sensor is understood to include not just the digital or analog signals or data from the sensor, but also interpretation of the sensor data by one or more computer processors.

Anomaly Detection by Comparison with Forecast

In some cases, an anomaly can be detected through a single sensor reading. For example, if the power supply draws too much current, it shuts down, or if a lid is opened during machining, the laser can be disabled. In other implementations, sensor data can be aggregated over time and analyzed to determine that an anomaly has occurred. This kind of anomaly detection is more difficult, as characteristic profiles of anomalies generally need to be determined, sensors chosen and aligned carefully, and anomalous events and standard events scrutinized to be able to reliably differentiate between the two.

One example of an anomaly can be a stepper motor that advanced most, but not all, of the steps requested of it. This phenomenon, called "skipping a step", is common when the mechanical systems become clogged or jammed. Missing a step causes a distinctive set of forces and motions that can be registered by an appropriate sensor such as an accelerometer. However, arduous experimentation is required to determine the precise set of acceleration parameters that indicate a missed step as opposed to other forces that made more typically be present. The profile can vary based on the machine, the instructions, the position of the machines constituents such as the head and the gantry, and other factors. For example, if the accelerometer is not perfectly placed and aligned at the factory, then some of the forces will appear in the wrong axis, and the "missed step" may not be detectable via the determined algorithm. To reliably create a system that detects missed steps can take a great deal of iterative and experimental work even after the core functionality is implemented.

Both of the prior steps attempt to anticipate the nature of the anomaly; and by their very nature, anomalies are difficult to predict, and a failure means a "false negative"—an anomaly that goes undetected. In other implementations, instead of attempting to predict what the signature of an anomaly would be, the system attempts to predict or calculate the sensor signature of non-anomalous behavior. For example, the system may predict (in advance of machining) or calculate (in realtime during machining) that the power supply will output a certain number of amps of current during cutting, and a certain, different number of amps during motor operation. It should be noted that any reference to predicting or forecasting sensor readings can also be calculated in realtime.

Figure 5:
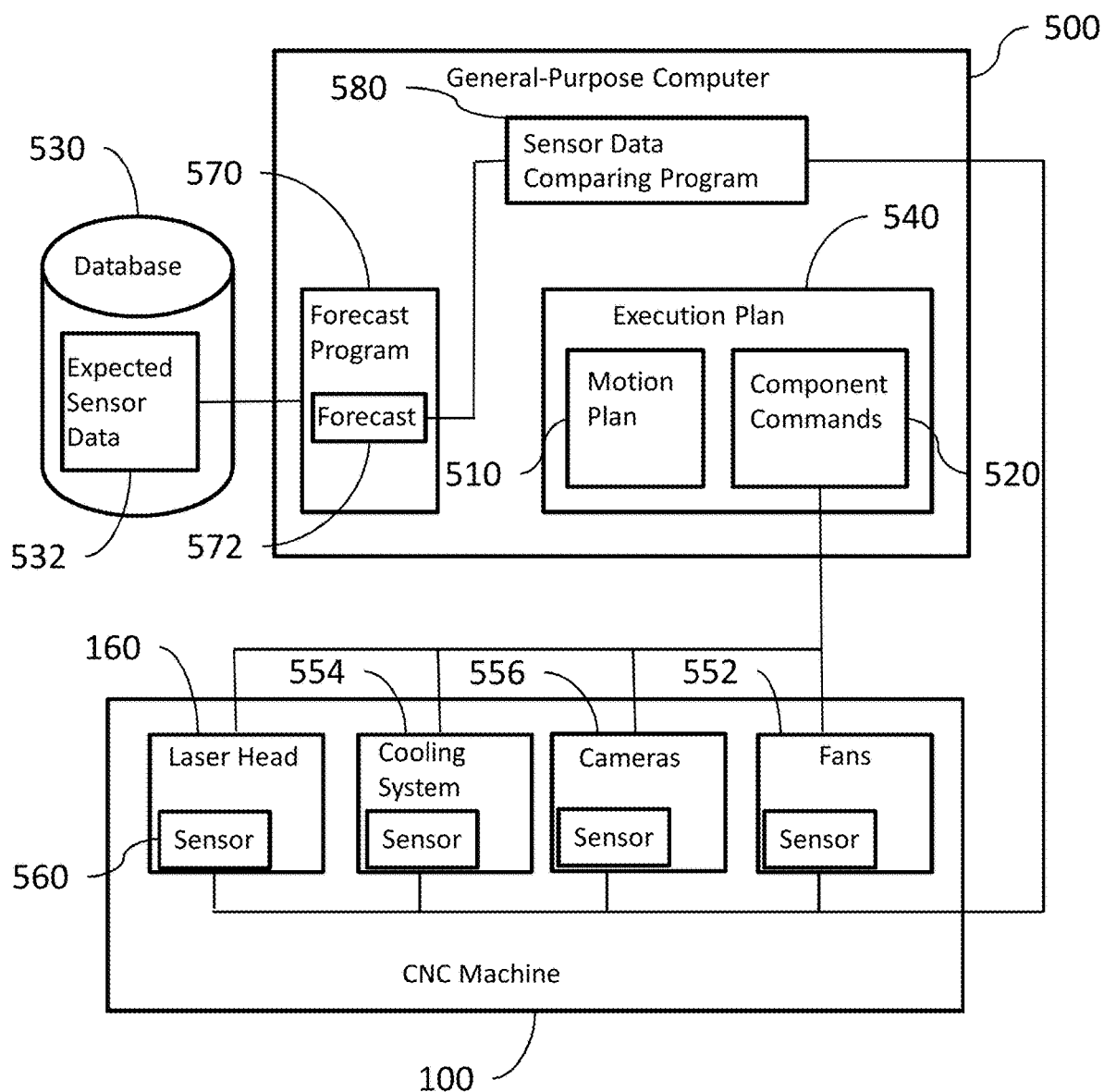
FIG. 5 is a system diagram illustrating a computer receiving sensor data to compare with expected sensor data for the detection of anomalies in the CNC machine, consistent with implementations of the current subject matter.

FIG. 5 is a system diagram illustrating a computer 500 receiving sensor data to compare with expected sensor data for the detection of anomalies in the CNC machine 100, consistent with implementations of the current subject matter. According to some implementations, to perform the detection of an anomalous event as described above, three types of data can be required. First, the motion plan 510, second, component commands 520 not included in the motion plan, and third, the expected sensor data 532 from those components due to the instructions. There can be an execution plan 540 that not only includes the motion plan, but also includes instructions for selectively activating other components and controlling their operation, such as when to turn fans 552 on or off, what speed to run fans, settings for the cooling 554 or ventilation system, when to activate cameras 556, what images to acquire, etc. The execution plan 540 can be related to known or expected sensor data, stored locally on the CNC machine 100 or accessed from a database 560 over a computer network, by the fact that the expected sensor data 532 can be determined before the CNC machine 100 operates. In some implementations, the motion planner (a computer program that generates the motion plan and/or the execution plan) can run in concert with a forecasting program 570 to both control the systems of the CNC machine and also generate a forecast 572 of the expected sensor data based on the motion plan. A sensor data comparing program 580 can compare the expected sensor data with the sensor data measured by sensors during operation of the CNC machine to determine if an anomalous event has occurred.

The generation of the execution plan can occur on the CNC machine 100 or on a general-purpose computer in communication with the CNC machine over a data connection. Examples of general-purpose computers can include, for example, PCs, tablet computers, smartphones, laptop computers, etc. The data connection can be, for example, the Internet, a wide area network, a wireless network, a USB connection, or a serial connection.

The execution plan thus provides a comprehensive description of the operation of the CNC machine. However, because the components in the CNC machine can affect the operation of each other, the execution plan can, in some implementations, be generated in an iterative manner to result in an allowable and consistent execution plan. For example, if a motion plan instructs the CNC machine to make a high speed cut, the execution fan can also include commands to turn on a fan to quickly clear the debris. However, if the system had accessed sensor data from similar past operations indicating that the fan could not operate to clear that type of debris quickly enough to make a proper cut, then the cut speed can be reduced to an acceptable level.

In some implementations, a computer program, for example a forecasting program, can forecast (or model) an expected response from one or more subsystems of the CNC machine 100. Alternatively, the expected response can be stored in a computer memory and accessed by the CNC machine 100 or the computer executing the forecasting program. In one example, if the forecasting program has expected responses (known from the execution plan) from one of the motors, then that same the forecasting program can forecast the behavior of sensors in the CNC machine 100 that are affected by the motor, for example an optical shaft encoder on that same motor. The forecast can be generated based on the execution plan and used to detect anomalies as described below.

Use of the expected sensor data from the forecast presupposes that there are no components of the CNC machine that affect the sensors in unanticipated ways. For example, the forecasting program for the sensors on the laser head can accurately forecast the position and motion of the laser head. Thus, the forecasting program can forecast the readings of one or more position sensors on the laser head. This is not true if another subsystem—for example a fan, which is turned on without knowledge of the motion planner—affects the sensor, for example by causing vibrations that are transmitted through to the laser head. If the system is aware of all intended subsystems that can affect the sensor readings, then if the system can forecast the sensor readings accurately within some margin of error to account for normal outside interference (for example vibrations from people walking nearby), then any deviation from the sensor readings is of concern and should be investigated. Further actions can be taken in response to the anomaly detection, for example, shutting down the CNC machine 100 or putting one or more components into a safe state, alerting a user with an alarm or other electronic message, etc. Alternatively, after the action or corrective action, new motion or execution plans can be generated or executed. Executing the motion plan can include proceeding without change to the motion plan or the forecast. Going back to generating the execution plan can then include updating the motion plan and consequently the expected sensor data and the forecast.

Figure 6:
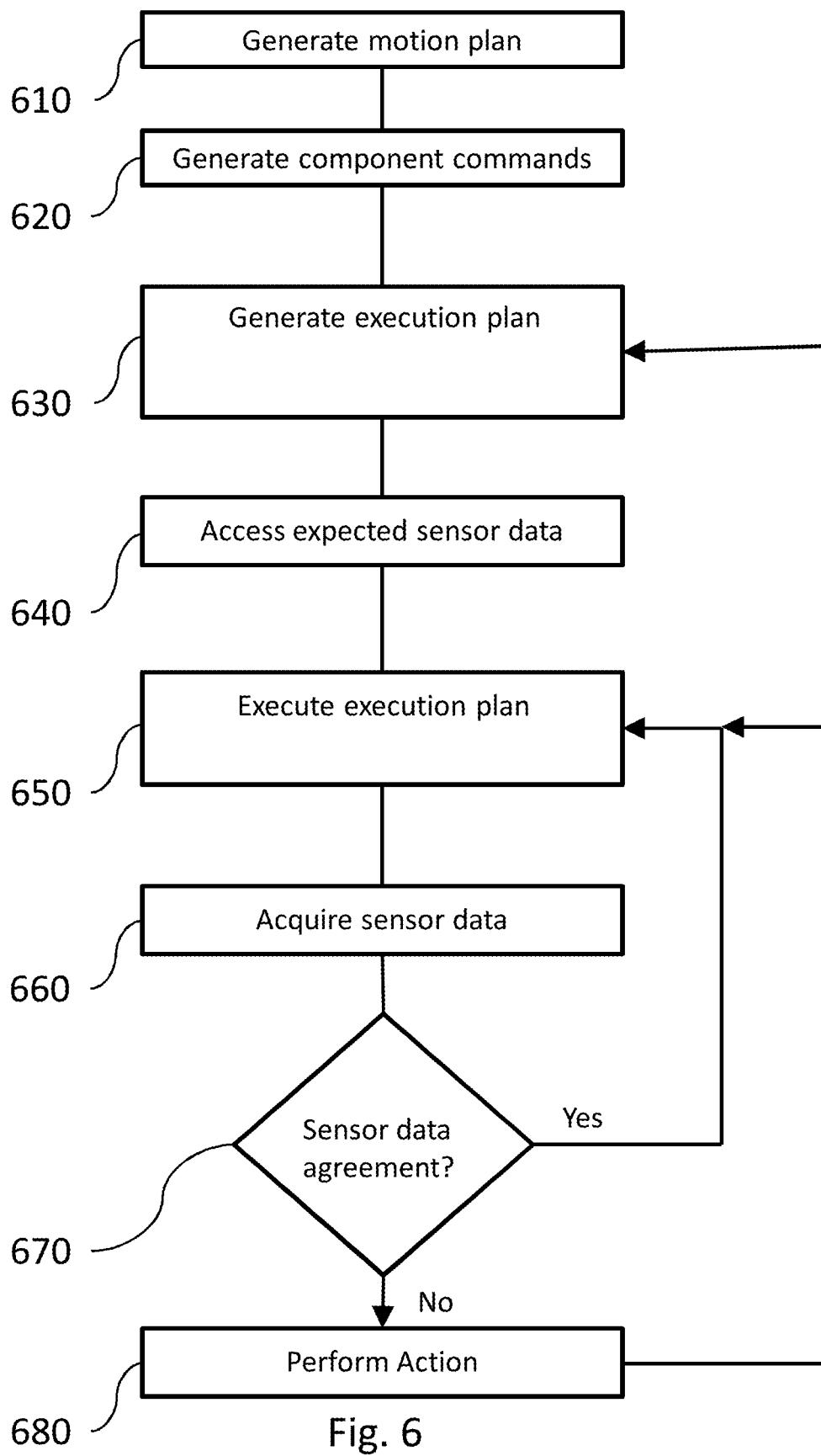
FIG. 6 is a process flow diagram illustrating detection of anomalies in the CNC machine, consistent with implementations of the current subject matter. At, the motion plan can be generated by the motion planner.

FIG. 6 is a process flow diagram illustrating detection of anomalies in the CNC machine, consistent with implementations of the current subject matter. At 610, the motion plan can be generated by the motion planner. At 620, component commands can also be generated by the motion planner. At 660, the execution plan can be generated by combining the motion plan and the component commands. At 640, expected sensor data can be accessed from a computer memory. At 650, the execution plan can be executed by the CNC machine. At 460, during operation of the CNC machine 100, sensor data can be acquired.

At 670, with an execution plan in place, the CNC machine 100 can detect anomalies by monitoring sensor data generated by any of the sensors and comparing that sensor data with the forecast. The forecast, as described above, includes expected sensor data for the sensor over a course of the execution plan. Sensor data can be acquired, for example, while making a cut with the head according to the execution plan. At 670, when the sensor data is in agreement with the acquired sensor data, no anomaly is detected and operation of the CNC machine continues according to the execution plan as in 650. When it is detected that the sensor data for a specific part of the execution plan deviates from the forecast for the specific part of the sensor plan, then it can be determined that an anomalous condition has occurred. At 680, in response to determining that an anomaly has occurred, an action, can be performed. Actions can include notifying the user of the CNC machine, stopping operation of the CNC machine, changing operation of the CNC machine, turning a laser on or off, changing the laser power, taking an image with a camera, etc.

In many cases, there may be an allowable variation. For example, a small amount of vibration can be expected due to the motion of people nearby, or current readings through a resistive element can vary slightly based on uncharacterized ambient conditions such as humidity. The degree of allowable variation can be constant, for example a reading may always be allowed a +/−10% buffer, or it may be forecasted by the motion plan—for example, when motors are moving there may be a very small margin of allowance for unusual vibrations, but when the fans are running at full power a greater variation in vibration may be expected as the fans' vibration characteristics are less consistent than the motors'.

Below are some specific sensors implemented to perform functions similar to the above described process:

1) Position sensors, for example accelerometers, which measure acceleration and other derivatives of position. These can be affected by, for example, motors, fans, cooling pumps, speakers, etc. In this example, a spurious acceleration (such as an off-balance fan) or a missing acceleration (such as an instruction to move that had no effect) would both be detected as anomalies. Here, the corrective action can include, for example, increasing or decreasing an acceleration of the head to compensate.

2) Temperature sensors can be affected by laser output, power dissipated by the power supply, cooling units such as thermoelectric coolers, fans, the motion of the machine created by the motors, etc. It is also affected by the ambient temperature, so any forecast of the temperature sensor reading must either allow for variation such as might be found in the normal operational envelope of the system. In some implementations, there can be a separate temperature sensor to measure ambient air only, so that factor may be subtracted from the system to isolate temperature variations arising from internal anomalies. In this example, the system might detect either a failure of a cooling unit (temperature higher than forecasted) or a failure of the laser tube (temperature not rising as predicted when the laser is instructed to fire). Here, the corrective action can include, for example, increasing the output of a redundant cooling unit, alerting a user, or executing a controlled shutdown of the CNC machine.

This method of anomaly detection is unique because an anomaly, such as a missed stepper motor step, does not need to be recognized by a particular set of sensor readings. Instead, the system observes that the sensor readings are not as expected, and alerts the user for further diagnostics. While the readings can be subsequently analyzed to try and determine the cause of the anomaly, for example the skipped stepper motor step, there is at least a confirmation that an anomaly occurred.

This approach is further desirable because anomalous behavior is by definition rare, whereas behavior within normal parameters is common. That makes it possible to aggregate large amounts of data to account for acceptable variations in sensor data, excluding only anomalous data. A CNC machine 100 connected to the internet can continually report sensor readings and continually update its sensitivity to anomalous behavior, improving over time.

For example, it may be determined by testing a prototype unit that, if a single fan is running, vibrations up to a certain threshold are acceptable sensor reading for an accelerometer. However, a study of returned units and their vibration signatures may find that in fact vibrations over a different, lower threshold indicate a high likelihood of failure in the future. In this case, the threshold for an anomalous reading would be reduced. Similarly, if the laser repeatedly paused and reported a detected anomaly when the user simply walked past, this could be reported and the accelerometer sensor reading threshold raised to eliminate false positives.

Detecting Errors in Output

The cameras can detect a wide range of errors in output, allowing various techniques to be used to compensate. Some basic examples include:

1) Burn marks, melting, or other material issues can require a different approach to machining, for example, reduced power, multiple low-power passes, masking, etc., or simply using a different material.

2) Parts falling under the grate: If the material is placed on rails, a hex grid, or other surface to keep it from sitting on the bottom plate, a common situation with lasers, the material may fall down when cut free. The material can then slide under other material and be cut twice, or if further cuts are to be made on the material, they can be out of focus because the material has fallen down.

3) Cut failure: If something interrupts the beam, the laser fails, or other problems occur, this can be detected by the cameras.

4) Cut power lower than expected: If there is a software or hardware fault and the output power is less than expected, there are a number of visual cues that can be apparent: marks on the material, inadequate penetration of the material, in the case of a CNC bit stalling (bit not turning).

5) Wrong settings for material: The calibration process (described elsewhere in this application) means that the system knows what to expect from various power levels and speeds; if these are absent, it can be that the wrong material is loaded. The operator can be notified and the new material can be calibrated.

6) Material that has already been cut is curling up because of heat: This often happens with leather and can cause subsequent cuts to be misaligned. In this case, the cut could be paused and the operator notified to hold the material down, for example, with tape or magnets.

7) Material that has been cut loose blows away and so cannot be subsequently cut: This is often a problem with paper or other light, thin materials. When cutting concentric circles, if the outer circle is cut first, the paper may be blown away from exhaust airflow before the inner circle can be cut.

8) Similar to the above, when scrap pieces are cut out of a lightweight material such as paper, airflow can blow them into an area that will be cut later. Unlike the previous case, in this case the paper is scrap, but it may blow in the way of the laser. If this occurs, the laser power may be attenuated by the scrap and it may not cut through the material properly.

Inspecting Unusual behavior

In some cases the system may be able to determine that there is a problem but be unable to diagnose it based on non-image sensors. For a system where image processing happens slowly, for example on a slow processor or remotely via the internet, the system may be able to quickly detect that the motors used to move the head have begun consuming too much current. The system could shut down the motors immediately, and then use the camera to inspect the area and look for obstructions.

Any or all of the above errors can be detected by the cameras and image recognition system. Appropriate alerts can be issued to users, shop-keepers, or personnel that maintain the server or other CNC machine 100 software distribution personnel. The operation of the CNC machine 100 can be altered or stopped in response to the detected errors according to program instructions.

Detecting Fire

Certain circumstances could cause a fire to occur in the cutting area. The presence of fire and/or smoke can be detected by the cameras. Furthermore, various extinguishing approaches can be attempted, and their efficacy measured. For example, a small flame can be blown out by moving a source of air (sometimes found on the CNC head) over the fire. However, this can exacerbate a large fire. A camera can both determine whether or not the CNC machine 100 should try to blow out the fire, and abort the attempt if it appears to be failing.

In some cases, auxiliary options may be available, and the image system can decide which one to invoke, and how. For example, it might discharge an internal chemical fire extinguisher only for larger fires, allowing smaller ones to burn themselves out. In another example, it might send an email to an operator when there is any flame event, and issue a phone call or text message if the fire is large or continues for more than a few seconds.

Detecting Obstructions

A common source of problems in CNC machines are materials inadvertently left in the machining area, for example a tool left on the bed of the CNC machine 100. An imaging system can detect unknown objects, for example by recognizing objects tall enough to cause a collision with the head, or objects located in positions that are off limits to materials for example outside the perimeter of the bed, and then take appropriate action such as notifying the user before beginning material processing.

Obstructions can also appear during machining: sometimes a piece can be cut in such a way that one end falls through a space below the material while the other end tips up. The cameras can detect such obstructions by, for example, comparing the observed material locations to the predicted material locations, or by observing that the material is protruding vertically more than before, or by observing that the material is protruding high enough that it will interfere with the movement mechanism, and take appropriate action.

Finally, a common cause of failure in CNC milling is instructions that cause the mill to collide with the material being worked on. For example, if the bit attempts to move to an area occupied by material, it will collide with the material, potentially inflicting serious damage.

Under normal circumstances, "CAM" (computer aided machining) software analyzes the material and cut path to ensure that this doesn't occur, for example lifting the bit over the material when moving it. For this to work, the CAM software must be correctly informed, in advance, of the shape of the material. However, if the material is a different shape than the CAM software assumes, then a collision can occur anyway. The cameras can be used to prevent this by directly observing the potential collision before it occurs. If a potential collision is detected, the component about to collide with the material or other object can, for example, be halted, the motion plan updated, or both.

Other Methods of Anomaly Detection

Any of the sensors and methods for analyzing or using sensor data can be used individually or in combination. In some cases, approaches consistent with the current subject matter can provide redundancy. For example, if a smoke detector fails, image analysis from cameras can detect the presence of smoke. Sensors can be combined to provide differing levels or types of information. For example, a smoke detector could determine that smoke is in the CNC machine 100. The cameras could then provide image data and/or change their operation, to provide detailed imaging of areas of the CNC machine 100 where the smoke is originating or collecting. Alternatively, use of data from sensors with other primary functions for anomaly detection can enable a lower cost of manufacture.

Watchdog Monitoring

In some implementations, a watchdog program can be executed by the CNC machine 100, or a remote computer receiving a feed of sensor data from the CNC machine 100. The watchdog program can poll the condition of the CNC machine 100 by either requesting sensor data or analyzing the sensor data arriving. If the sensor data is normal, no additional actions need to occur. If the sensor data stops arriving, for whatever reason, the watchdog program can instruct the CNC machine 100 to execute further instructions, such as a controlled shutdown. If the watchdog program receives a definitive error state, the information can be logged or communicated to a user.

Controlled Shutdown

Figure 7:
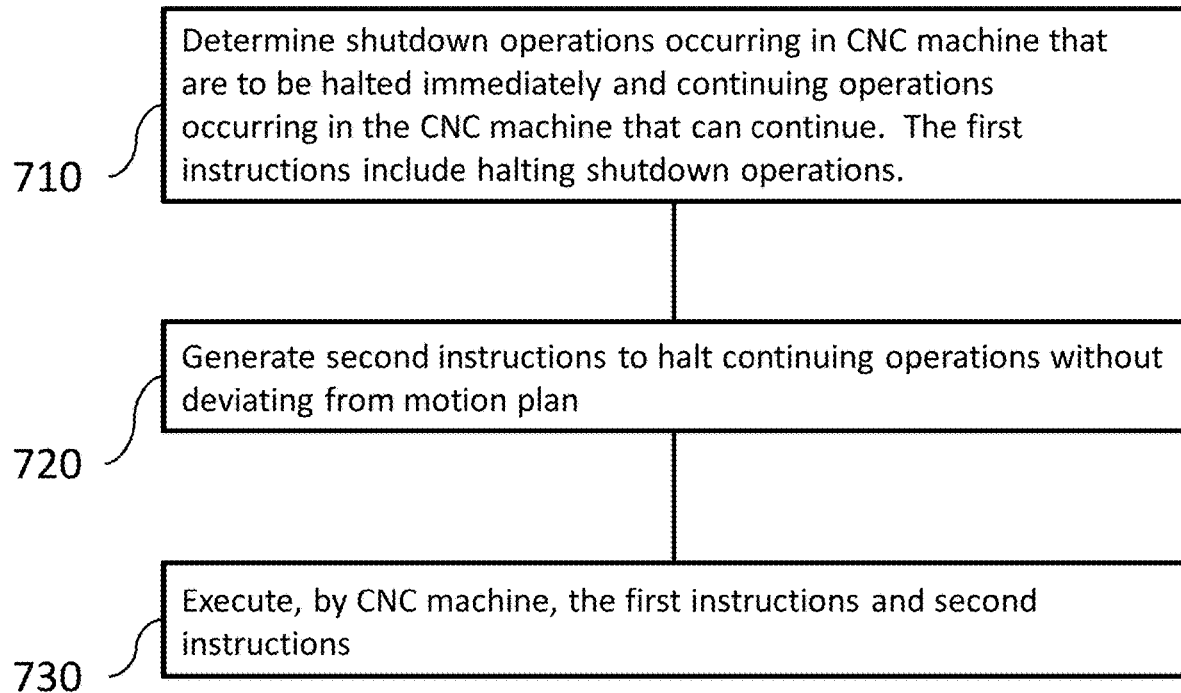
FIG. 7 is a process flow chart illustrating features of a method for a controlled shutdown, consistent with implementations of the current subject matter.

FIG. 7 is a process flow chart illustrating features of a method for a controlled shutdown, consistent with implementations of the current subject matter. In some implementations, when any anomalous condition is detected, the following events can occur, in any order. First, the laser or other tool or component in the CNC machine 100 can turn off or switch to a safe operating mode. Second, the head 160 can assume a safe position, for example out of the way. This can allow a user to retrieve the material or access the CNC machine 100 for repairs, but can also protect the components inside the head 160 from being bumped or touched. Alternately, the head 160 can be arrested immediately, so there is no risk of colliding with the user during movement. Third, a user can be alerted and the shutdown event logged along with any detected error states or other diagnostic data from the sensors in the CNC machine 100.

In another implementation, the controlled shutdown can be based on, or incorporated with, the motion plan. A hard shutdown can sometimes do more damage than the condition that triggered it. A machine bit can break, a thermal gradient on an optic can be exceeded, a project in progress can be left in an unsafe or partially completed state that would be difficult to resume, etc. The command for the shutdown, depending on the reason for the shutdown, can be executed immediately, or after a predetermined amount of the motion plan executes. For example, if the CNC machine 100 was set to stop at a certain time, the motion plan can be accessed to determine an optimum stopping point, even if this would exceed the scheduled shutdown time. In another implementation, if a laser is running and the lid is opened, the safety of the user could take precedence and the CNC machine 100 could shut down the laser, regardless of the consequence to the project. Intermediate steps could be taken as well, for example, going back to the case of the lid 130 being opened, a beam block can immediately move into position to again restrict the beam to an enclosed space. In the meantime, the laser can then perform a controlled shutdown, for example by letting some components ramp down, cooling systems run, etc.

In some implementations, in response to a detected anomaly, an emergency motion plan can be substituted for the current motion plan. The emergency motion plan can contain instructions for any or all of the systems of the CNC machine. The instructions can be different than in the current motion plan and, for example, result in the fastest safe shutdown of components. For example, the emergency motion plan can include decelerating motors at a predetermined pace such the motors do not skip steps. The state of the CNC machine 100 can be stored in a computer memory. The state can include, for example, positions, velocities, accelerations, orientations, and so on, of any or all components of the CNC machine 100.

As described above, and shown in FIG. 7, at 710, operations (e.g. shutdown operations) occurring in the CNC machine 100 can be determined that are to be halted immediately. Other operations (e.g. continuing operations) can be operations occurring in the CNC machine 100 that can continue. Instructions to the CNC machine 100 can include halting the shutdown operations.

At 720, further instructions can be generated to halt the continuing operations without deviating from the motion plan.

At 730, the CNC machine 100 can execute the above instructions.

Restart After Controlled Shutdown

Figure 8:
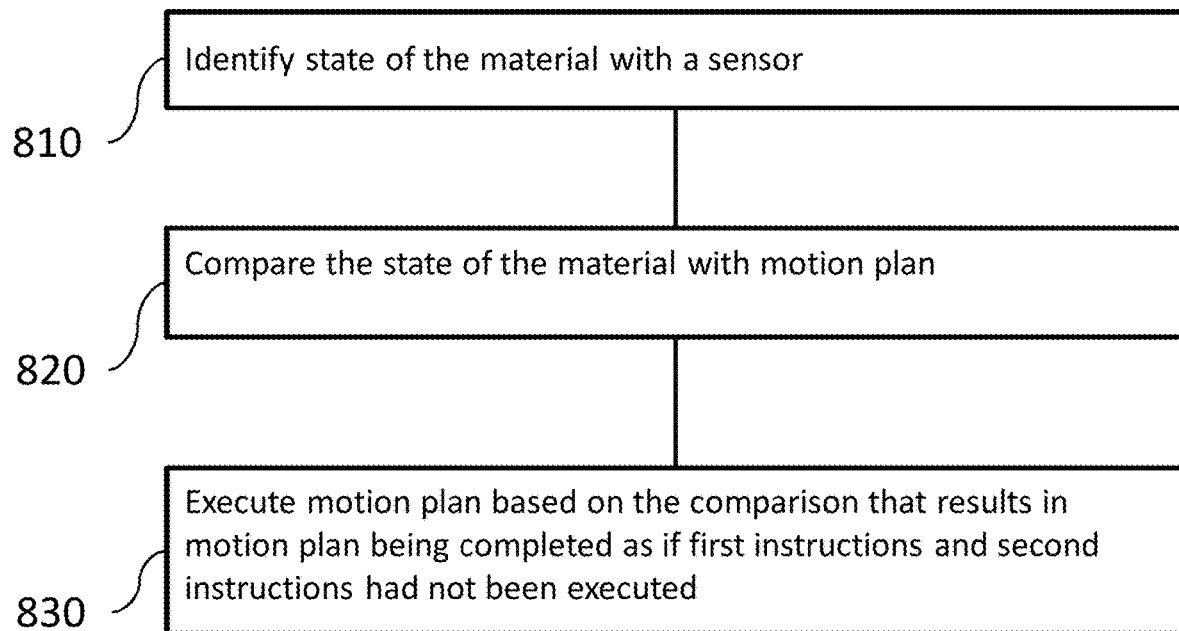
FIG. 8 is a process flow chart illustrating features of a method for a restarting the CNC machine after the controlled shutdown, consistent with implementations of the current subject matter.

FIG. 8 is a process flow chart illustrating features of a method for a restarting the CNC machine 100 after the controlled shutdown, consistent with implementations of the current subject matter. Similar to the feature of being restarted after a pause, also described in related U.S. Provisional Patent Application 62/115,562, the CNC machine 100 can resume after a controlled shutdown. In this case, the motion plan can be updated to allow for the possibility that some operations were not halted in an optimal manner. For example, if a cut was interrupted, the cameras can re-image the cut with the motion plan then proceeding according to analysis of the image data. This can include, for example, resuming the motion plan at the exact spot that it was interrupted, or proceeding from an earlier part of the motion plan so that the head is at the same velocity when the cut restarts as when it was aborted, or even proceeding from a later part of the motion plan. Data of the state of the CNC machine 100 can be recalled from computer memory and implemented when returning the CNC machine to the state it had prior to the shutdown.

As described above, and shown in FIG. 8, at 810, the state of the material can be identified by a sensor.

At 820, the state of the material can be compared with the motion plan.

At 830, the motion plan can be executed based on the comparison such that the motion plan is completed as if the instructions from a controlled shutdown had not been executed.

Figure 9:
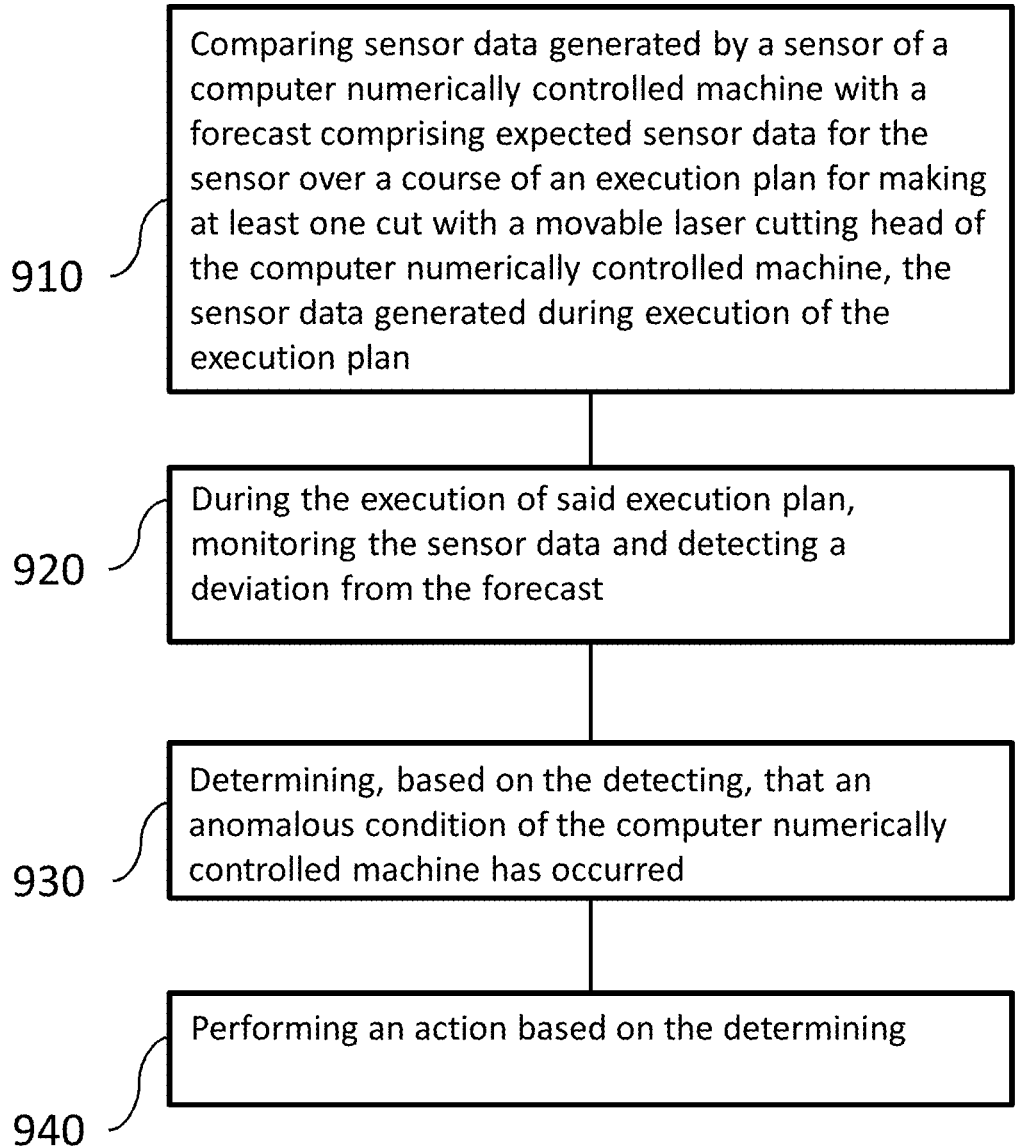
FIG. 9 is a process flow chart consistent with implementations of the current subject matter.

FIG. 9 is a process flow chart illustrating features of a method for determining that an anomalous condition has occurred in the CNC machine, consistent with implementations of the current subject matter.

At 910, sensor data generated by a sensor of the CNC machine can be compared with a forecast including expected sensor data for the sensor over a course of an execution plan. The execution plan can include making at least one cut with a movable laser cutting head of the CNC machine. The sensor data can be generated during execution of the execution plan.

At 920, it can be detected that the sensor data at a specific part of the execution plan deviates from the forecast for the specific part of the execution plan.

At 930, it can be determined that an anomalous condition of the CNC machine has occurred based on the detecting.

At 940, an action can be performed based on the determining. In some variations, the action can be a corrective action. In other variations the action can be a notification to the user of the anomalous condition.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions, which when executed by the at least one data processor, result in operations comprising:
      operating a computer numerically controlled machine to deliver an electromagnetic energy to a material at least partially disposed within an interior space of the computer numerically controlled machine;
      detecting, based at least on a first temperature measured by a first temperature sensor and a second temperature by a second temperature sensor, an anomalous condition while operating the computer numerically controlled machine to deliver the electromagnetic energy, at least one of the first temperature sensor and the second temperature sensor being configured to measure a temperature of a component of the computer numerically controlled machine; and
      responding to the anomalous condition by at least generating an alert, reducing an output of the electromagnetic energy, blocking the electromagnetic energy, reducing a thermal output one or more heat generating components of the computer numerically controlled machine, and/or locking a lid of the computer numerically controlled machine.

2. The system of claim 1, wherein the first temperature sensor have at least one of a different orientation and a different location within the computer numerically controlled machine than the second temperature sensor.

3. The system of claim 1, wherein the first temperature sensor is configured to measure an ambient temperature, and wherein the second temperature sensor is configured to measure a temperature of a working area within the interior space of the computer numerically controlled machine that contains at least a portion of the material.

4. The system of claim 1, wherein the component comprises a head delivering the electromagnetic energy, a controller, a lens, a mirror, a motor, a fan, a thermal control system, an air filter, a cooling unit, a camera, a lighting device, and/or an emitter of the electromagnetic energy.

5. The system of claim 1, wherein the anomalous condition includes a failure of the component of the computer numerically controlled machine.

6. The system of claim 1, wherein the anomalous condition is detected based at least on a magnitude of a difference between the first temperature and the second temperature.

7. The system of claim 1, wherein the executing of the instructions further results in operations comprising:
   determining, based at least on the first temperature, a threshold; and
   detecting the anomalous condition in response to the second temperature exceeding the threshold.

8. The system of claim 1, wherein the anomalous condition is detected by at least determining whether the first temperature and/or the second temperature correspond to the anomalous condition or a non-anomalous condition.

9. The system of claim 1, wherein the executing of the instructions further results in operations comprising:
   receiving, from a server, expected sensor data for the computer numerically controlled machine over a course of executing an execution plan, the execution plan describing actions performed by at least one component of the computer numerically controlled machine in order to deliver the electromagnetic energy to the material to cause one or more changes in the material, and the expected sensor data being generated at the server based at least on the execution plan; and
   comparing, during the execution of the execution plan, the first temperature and/or the second temperature with the expected sensor data; and
   detecting, based at least on the comparison indicating a deviation from the expected sensor data, the anomalous condition.

10. The system of claim 1, wherein the at least one data processor and the at least one memory comprises a controller disposed at the computer numerically controlled machine.

11. The system of claim 1, wherein the at least one data processor and the at least one memory comprises a computer communicatively coupled with the computer numerically controlled machine via wired network and/or a wireless network.

12. The system of claim 1, wherein the system further comprises the computer numerically controlled machine having the first temperature sensor and the second temperature sensor.

13. The system of claim 1, wherein the computer numerically controlled machine includes a motion sensor configured to determine a positon of at least one component of the computer numerically controlled machine, and wherein the anomalous condition is further detected based on the positon of the at least one component of the computer numerically controlled machine.

14. The system of claim 1, wherein the computer numerically controlled machine includes a pressure sensor configured to measure an air pressure within the interior space of the computer numerically controlled machine, and wherein the anomalous condition is further detected based on the air pressure within the interior space of the computer numerically controlled machine.

15. The system of claim 1, wherein the computer numerically controlled machine includes a smoke sensor configured to measure a quantity of smoke present within the interior space of the computer numerically controlled machine, and wherein the anomalous condition is further detected based on the quantity of smoke present within the interior space of the computer numerically controlled machine.

16. A computer-implemented method, comprising:
 operating a computer numerically controlled machine to deliver an electromagnetic energy to a material at least partially disposed within an interior space of the computer numerically controlled machine;
 detecting, based at least on a first temperature measured by a first temperature sensor and a second temperature by a second temperature sensor, an anomalous condition while operating the computer numerically controlled machine to deliver the electromagnetic energy, at least one of the first temperature sensor and the second temperature sensor being configured to measure a temperature of a component of the computer numerically controlled machine; and
 responding to the anomalous condition by at least generating an alert, reducing an output of the electromagnetic energy, blocking the electromagnetic energy, reducing a thermal output one or more heat generating components of the computer numerically controlled machine, and/or locking a lid of the computer numerically controlled machine.

17. A non-transitory computer readable medium storing instructions, which when executed by at least one data processor, result in operations comprising:
 operating a computer numerically controlled machine to deliver an electromagnetic energy to a material at least partially disposed within an interior space of the computer numerically controlled machine;
 detecting, based at least on a first temperature measured by a first temperature sensor and a second temperature by a second temperature sensor, an anomalous condition while operating the computer numerically controlled machine to deliver the electromagnetic energy, at least one of the first temperature sensor and the second temperature sensor being configured to measure a temperature of a component of the computer numerically controlled machine; and
 responding to the anomalous condition by at least generating an alert, reducing an output of the electromagnetic energy, blocking the electromagnetic energy, reducing a thermal output one or more heat generating components of the computer numerically controlled machine, and/or locking a lid of the computer numerically controlled machine.

\* \* \* \* \*